(12) United States Patent
Song et al.

(10) Patent No.: US 7,583,345 B2
(45) Date of Patent: Sep. 1, 2009

(54) LIQUID CRYSTAL DISPLAY

(75) Inventors: Jang-Kun Song, Seoul (KR); Jae-Jin Ryu, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/557,670

(22) Filed: Nov. 8, 2006

(65) Prior Publication Data

US 2007/0081116 A1 Apr. 12, 2007

Related U.S. Application Data

(60) Division of application No. 11/175,322, filed on Jul. 7, 2005, now Pat. No. 7,154,577, which is a continuation of application No. 10/838,346, filed on May 5, 2004, now Pat. No. 6,952,247, which is a continuation of application No. 09/676,812, filed on Oct. 2, 2000, now Pat. No. 6,738,120.

(30) Foreign Application Priority Data

Oct. 1, 1999 (KR) .............................. 1999-42216

(51) Int. Cl.
*G02F 1/1337* (2006.01)
(52) U.S. Cl. ..................................................... 349/129
(58) Field of Classification Search .......... 349/129–130
See application file for complete search history.

(56) References Cited

U.S. PATENT DOCUMENTS

| 4,385,806 | A | 5/1983 | Fergason |
| 4,701,028 | A | 10/1987 | Clerc et al. |
| 4,786,147 | A | 11/1988 | Clerc et al. |

(Continued)

FOREIGN PATENT DOCUMENTS

CN 1211745 3/1999

(Continued)

OTHER PUBLICATIONS

N. Koma, Y. Baba, K. Matsuoka, Sanyo Electronic Co., Ltd., No-Rub Multi-Domain TFT-LCD Using Surrounding-Electrode Method, 41.2/Koma SID Digest, 1995, pp. 869-872, Gifu, Japan.

*Primary Examiner*—James A Dudek
(74) *Attorney, Agent, or Firm*—F. Chau & Associates, LLC.

(57) ABSTRACT

A liquid crystal display includes a first insulating substrate with a top surface and a bottom surface. A pixel electrode is formed on the top surface of the first insulating substrate. The pixel electrode has a first opening pattern at each pixel area. The pixel electrode with the first opening pattern is substantially rectangular in shape with a first long side and a second long side, and first short side and a second short side. The pixel electrode is divided into an upper region defined by the first long side and the second long side and the first short side, and a lower region defined by the first long side and the second long side and the second short side. A second insulating substrate with a top surface and a bottom surface is arranged parallel to the first insulating substrate at a predetermined distance from the same such that the bottom surface of the second insulating substrate faces the top surface of the first insulating substrate. A common electrode is formed on the bottom surface of the second insulating substrate. The common electrode has a second opening pattern at each pixel area, which correspond to each pixel area of the pixel electrode. A liquid crystal layer is sandwiched between the first substrate and the second substrate while contacting the pixel electrode and the common electrode. The first opening pattern and the second opening pattern each have a plurality of openings, the openings of the first opening pattern and the second opening pattern being alternately arranged parallel to each other.

17 Claims, 40 Drawing Sheets

U.S. PATENT DOCUMENTS

| | | | |
|---|---|---|---|
| 4,878,742 A | 11/1989 | Ohkubo et al. | |
| 4,889,412 A | 12/1989 | Clerc et al. | |
| 5,136,407 A | 8/1992 | Clerc | |
| 5,172,256 A | 12/1992 | Sethofer et al. | |
| 5,298,199 A | 3/1994 | Hirose et al. | |
| 5,309,264 A | 5/1994 | Lien et al. | |
| 5,405,490 A | 4/1995 | Park et al. | |
| 5,434,690 A | 7/1995 | Hisatake et al. | |
| 5,473,455 A | 12/1995 | Koike et al. | |
| 5,579,140 A | 11/1996 | Yamahara et al. | |
| 5,583,679 A | 12/1996 | Ito et al. | |
| 5,608,556 A | 3/1997 | Koma | |
| 5,619,352 A | 4/1997 | Koch et al. | |
| 5,673,092 A | 9/1997 | Horie et al. | |
| 5,745,206 A | 4/1998 | Koike et al. | |
| 5,757,451 A | 5/1998 | Miyazaki et al. | |
| 5,870,611 A | 2/1999 | London Shrader et al. | |
| 5,872,611 A | 2/1999 | Hirata et al. | |
| 5,907,380 A | 5/1999 | Lien | |
| 5,917,572 A | 6/1999 | Kurauchi et al. | |
| 5,953,093 A | 9/1999 | Hirata et al. | |
| 5,986,732 A | 11/1999 | Ozeki et al. | |
| 5,995,190 A | 11/1999 | Nagae et al. | |
| 6,061,116 A | 5/2000 | Nishida et al. | |
| 6,061,117 A | 5/2000 | Horie et al. | |
| 6,147,729 A | 11/2000 | Kurauchi et al. | |
| 6,191,836 B1 | 2/2001 | Woo et al. | |
| 6,266,116 B1 | 7/2001 | Ohta et al. | |
| 6,266,166 B1 | 7/2001 | Katsumata et al. | |
| 6,288,762 B1 | 9/2001 | Saski et al. | |
| 6,342,938 B1 | 1/2002 | Song et al. | |
| 6,512,561 B1 | 1/2003 | Terashita et al. | |
| 6,704,083 B1 | 3/2004 | Kim et al. | |
| 6,710,837 B1 | 3/2004 | Song et al. | |
| 6,724,452 B1 | 4/2004 | Takeda et al. | |
| 6,879,364 B1 * | 4/2005 | Sasaki et al. | 349/129 |
| 6,992,742 B2 * | 1/2006 | Kim et al. | 349/129 |
| 2003/0053019 A1 | 3/2003 | Song et al. | |

FOREIGN PATENT DOCUMENTS

| | | |
|---|---|---|
| EP | 0 568 355 B1 | 11/1993 |
| EP | 0 621 501 B1 | 10/1994 |
| EP | 0 636 917 A1 | 2/1995 |
| EP | 0 676 661 A2 | 10/1995 |
| EP | 0 854 377 A2 | 7/1998 |
| EP | 0 884 626 A2 | 12/1998 |
| EP | 0 445 777 A2 | 9/2001 |
| GB | 1 462 978 | 1/1977 |
| JP | 07-199193 | 8/1985 |
| JP | 60-256121 | 12/1985 |
| JP | 01-189629 | 7/1989 |
| JP | 01-196020 | 8/1989 |
| JP | 02-035416 | 2/1990 |
| JP | 02-151830 | 6/1990 |
| JP | 02-190825 | 7/1990 |
| JP | 03-043701 | 2/1991 |
| JP | 03-209220 | 9/1991 |
| JP | 03-261914 | 11/1991 |
| JP | 04-251285 | 9/1992 |
| JP | 05-173142 | 7/1993 |
| JP | 06-043461 | 2/1994 |
| JP | 06-082777 | 3/1994 |
| JP | 06-258649 | 9/1994 |
| JP | 06-301036 | 10/1994 |
| JP | 07-013164 | 1/1995 |
| JP | 07-020469 | 1/1995 |
| JP | 07-028063 | 1/1995 |
| JP | 07-043719 | 2/1995 |
| JP | 07-064089 | 3/1995 |
| JP | 07-104450 | 4/1995 |
| JP | 07-120767 | 5/1995 |
| JP | 07-147426 | 6/1995 |
| JP | 07-199190 | 8/1995 |
| JP | 07-199205 | 8/1995 |
| JP | 07-225389 | 8/1995 |
| JP | 07-230097 | 8/1995 |
| JP | 07-234414 | 9/1995 |
| JP | 07-281195 | 10/1995 |
| JP | 07-311383 | 11/1995 |
| JP | 07-318950 | 12/1995 |
| JP | 07-333617 | 12/1995 |
| JP | 08-006052 | 1/1996 |
| JP | 08-022023 | 1/1996 |
| JP | 08015714 | 1/1996 |
| JP | 08-029790 | 2/1996 |
| JP | 08-029812 | 2/1996 |
| JP | 08-043825 | 2/1996 |
| JP | 08-076125 | 3/1996 |
| JP | 08-095054 | 4/1996 |
| JP | 08-101396 | 4/1996 |
| JP | 08-101399 | 4/1996 |
| JP | 2507122 | 4/1996 |
| JP | 08-220511 | 8/1996 |
| JP | 08-220524 | 8/1996 |
| JP | 08-292423 | 11/1996 |
| JP | 09-033882 | 2/1997 |
| JP | 09-043592 | 2/1997 |
| JP | 09-105908 | 4/1997 |
| JP | 09-120072 | 5/1997 |
| JP | 09-120075 | 5/1997 |
| JP | 09-160061 | 6/1997 |
| JP | 10-048634 | 2/1998 |
| JP | 11-109358 | 4/1999 |
| JP | 11-133413 | 5/1999 |
| JP | 11-242225 | 9/1999 |
| JP | 2000-155317 | 6/2000 |
| WO | 97-12275 | 4/1997 |

* cited by examiner

A　　B　　C　　D

E　　F　　G　　I　　J

FIG. 14
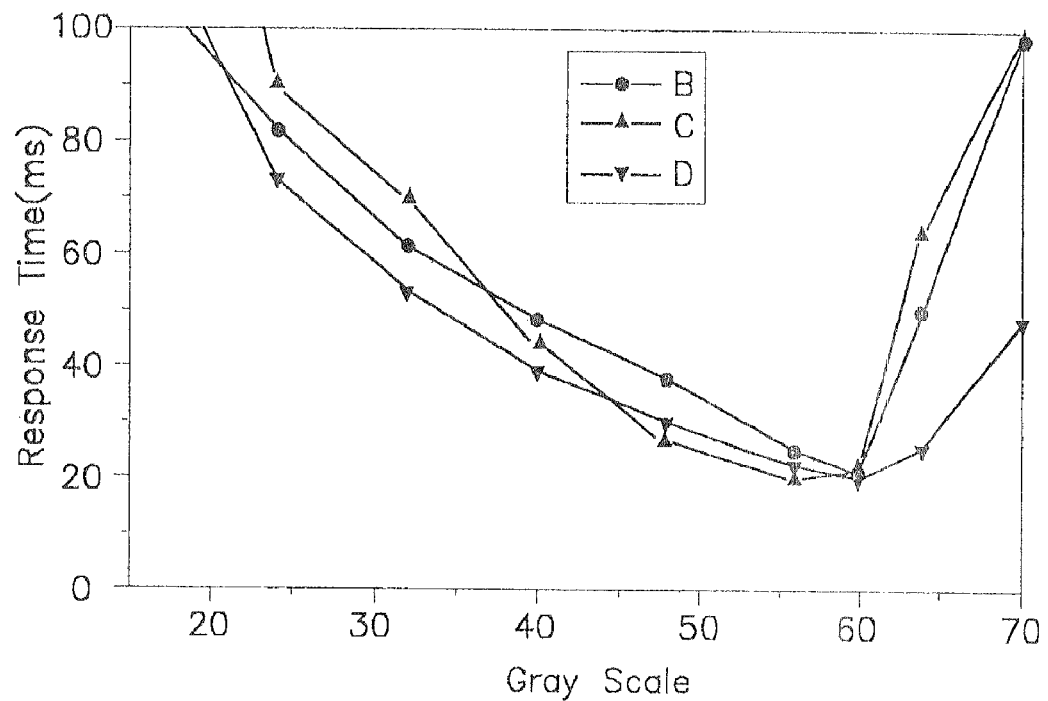
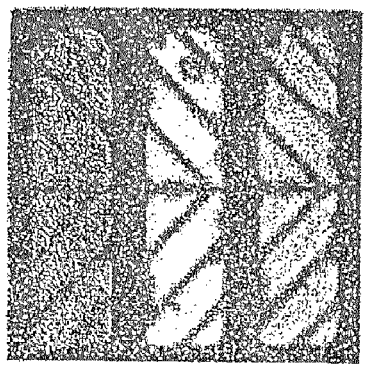
C Pattern(width:7um)
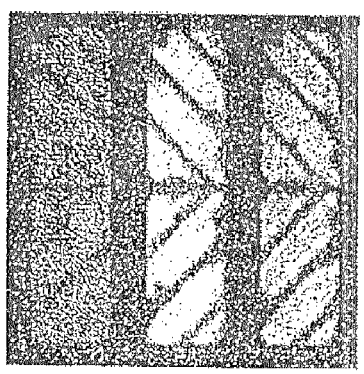
B Pattern(width:10um)
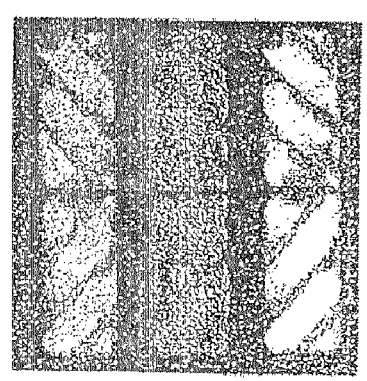
D Pattern(width:13um)
FIG.15A   FIG.15B   FIG.15C C Pattern:3V-> 3.5V -> 4V -> 5V D Pattern:3V-> 3.5V-> 4V-> 5V Small Width, Low Voltage Small Width, High Voltage Large Width, Low Voltage Large Width, High Voltage

LIQUID CRYSTAL DISPLAY

CROSS-REFERENCE TO RELATED APPLICATION

This application is a divisional of U.S. patent application Ser. No. 11/175,322, filed on Jul. 7, 2005, now U.S. Pat. No. 7,154,577, which is a continuation of Ser. No. 10/838,646 filed May 5, 2004 now U.S. Pat. No. 6,952,247 issued on Oct. 4, 2005, which is a continuation of Ser. No. 09/676,812 filed Oct. 2, 2000 now U.S. Pat. No. 6,738,120 issued on May 18, 2004, which claims priority to Korean Patent Application No. 1999-42216, filed on Oct. 1, 1999, the disclosures of which are all incorporated by reference herein in their entirety.

BACKGROUND OF THE INVENTION (a) Field of the Invention

The present invention relates to a liquid crystal display (LCD) and, more particularly, to an LCD in which a predetermined opening pattern is formed at pixel and common electrodes such that a wide viewing angle is obtained.

(b) Description of the Related Art

Generally, an LCD has a structure having a liquid crystal layer that is sandwiched between two substrates. An electric field is applied to the liquid crystal layer to control the alignment of the liquid crystal molecules, ultimately controlling the transmittance of incident light. In a vertically aligned (VA) LCD, the liquid crystal molecules are aligned perpendicular to the substrates when an electric field is not applied. In case two polarizer films are arranged with their polarizing directions perpendicular to each other, the linearly polarized light passing through the first polarizer film is completely blocked by the second polarizer film in the absence of an electric field. The complete blockage of lights exhibits a very low brightness in and "off" state of the normally black mode. This helps a VA LCD obtain relatively higher contrast ratio than that of the conventional TN liquid crystal display.

However, the liquid crystal molecules are irregularly inclined against the substrate when an electric filed is applied. Therefore, in one or more areas, the long axis directions of some of the liquid crystal molecules are aligned with the polarizing direction of the first polarizer film or the second polarizer film. In such areas, the liquid crystal molecules cannot rotate the polarizing direction, i.e., polarization, and the light is completely blocked by the polarizer film. Such areas appear as black portions on the screen, which degrade the in picture quality. These areas are referred to as areas of "texture."

In order to solve the above problem, several techniques of electrode-patterning have been suggested. However, a slow response time still remains as a problem.

FIG. 1 illustrates a schematic view of opening patterns formed at pixel and common electrodes in a prior art liquid crystal display. As shown in FIG. 1, the pixel and common electrodes are formed with opening patterns 1 and 2, respectively. Each of the opening patterns 1 and 2 is formed in a V-shape and is arranged with ends of the V-shapes in proximity to each other so that roughly a diamond shape is formed by the opening patterns 1 and 2. Liquid crystal material is injected between the pixel electrode and the common electrode, and liquid crystal molecules 3 are aligned perpendicular to the electrodes.

When an electric field is applied to the liquid crystal material, the liquid crystal molecules 3 come to be arranged parallel to the electrodes. However, the response speed of the liquid crystal molecules 3 with respect to the applied electric field is very slow with the formation of the opening patterns 1 and 2 at the pixel and common electrodes. That is, as a result of a fringe field formed due to the opening patterns 1 and 2, the liquid crystal molecules 3 are first arranged perpendicular to the opening patterns 1 and 2 (A state), then are aligned to be parallel with one another (B state), because liquid crystal molecules tend to align themselves roughly parallel along their long axes. These two steps of alignment slow down the response speed.

The slow response speed of liquid crystal molecules generates after-images when displaying moving pictures on the screen. There is therefore a need to increase the response speed of liquid crystal molecules.

SUMMARY OF THE INVENTION

It is an object of the present invention to provide a liquid crystal display which has an improved response speed and a wide viewing angle.

It is another object of the present invention to provide a liquid crystal display that shows improved picture images.

These and other objects may be achieved by a liquid crystal display having a first insulating substrate with top and bottom surfaces. A pixel electrode is formed on the top surface of the first insulating substrate. The pixel electrode has a first opening pattern at each pixel area. The pixel electrode with the first opening pattern is substantially rectangular in shape and having first and second long sides, and first and second short sides. The pixel electrode is divided into an upper region defined by the first and second long sides and the first short side, and a lower region defined by the first and second long sides and the second short side. A second insulating substrate with top and bottom surfaces is arranged parallel to the first insulating substrate at a predetermined distance from the same such that the bottom surface of the second insulating substrate faces the top surface of the first insulating substrate. A common electrode is formed on the bottom surface of the second insulating substrate. The common electrode has a second opening pattern at each pixel area, which corresponds to each pixel area of the pixel electrode. A liquid crystal layer is sandwiched between the first and second substrates while contacting the pixel and common electrodes.

The first and second opening patterns each have a plurality of openings, the openings of the first and second opening patterns being alternately arranged parallel to each other.

The first and second opening patterns each have a middle linear portion. The linear portions of the first and second opening patterns are alternately arranged parallel to each other. The first opening pattern includes a first opening formed in the upper region of the pixel electrode in a first direction. A second opening portion is formed in the lower region of the pixel electrode in a second direction normal to the first direction. The second opening pattern includes a first trunk opening formed in the upper region of the common electrode in the first direction, and a second trunk opening formed in the lower region of the common electrode in the second direction. The first direction is slanted at a predetermined angle with respect to the long or short sides of the pixel electrode. The second opening pattern further includes first branch openings overlapping the first and second short sides of the pixel electrode, and second branch openings overlapping the first and second long sides of the pixel electrode. The first opening pattern further includes a third opening formed where the upper and lower regions of the pixel electrode meet while proceeding parallel to the first and second short sides of the pixel electrode. The second branch openings each have a width greater than that of the trunk opening portion. The first direction is parallel to one of the long and short sides of the pixel electrode. The first and second trunk openings each have opposite ends respectively with a gradually enlarged width. One of the second trunk openings overlaps the second short side of the pixel electrode. The first opening has opposite ends respectively with a gradually reduced width.

The pixel and common electrodes are overlapped with each other such that the first and second opening patterns partition the pixel electrode into several micro-regions. The micro-regions of the pixel electrode are in the shape of polygons where the longest sides are parallel to each other. The micro-regions of the pixel electrode are classified into a first type where the longest sides are arranged in a first direction and a second type where the longest sides are arranged in a second direction normal to the first direction. The first direction is slanted at a predetermined angle with respect to the long or short sides of the pixel electrode. Alternatively, the first direction may be parallel to one of the long and short sides of the pixel electrode.

The first and second opening patterns form fringe fields when voltage is applied between the pixel and common electrodes. The orienting direction of the liquid crystal molecules due to the fringe fields corresponds to that of the liquid crystal molecules as a result of a force exerted by the molecules. It is preferable that the liquid crystal molecules are oriented in four directions. The opening width of the first and second opening patterns is preferably in the range of 10-16 μm.

The pixel electrode may have protrusions at the sides adjacent to the ends of the first and second openings.

BRIEF DESCRIPTION OF THE DRAWINGS

A more complete appreciation of the invention, and many of the attendant advantages thereof, will be readily apparent as the same becomes better understood by referring to the following detailed description when considered in conjunction with the accompanying drawings in which like reference symbols indicate the same or the similar components, wherein:

FIG. 14 is a graph illustrating response times as a function of gray scale of actual panels applying specific opening patterns shown in FIG. 11;

FIGS. 15A to 15C are photographs of specific opening patterns shown in FIG. 11 at white gray scales;

DETAILED DESCRIPTION OF THE PREFERRED EMBODIMENTS

Preferred embodiments of this invention will be explained with reference to the accompanying drawings.

Figure 1:
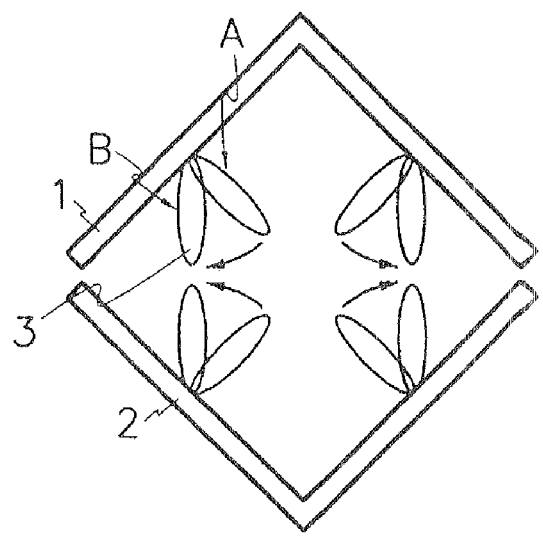
FIG. 1 is a schematic view of opening pattern units formed at common and pixel electrodes in a prior art liquid crystal display.
Figure 2:
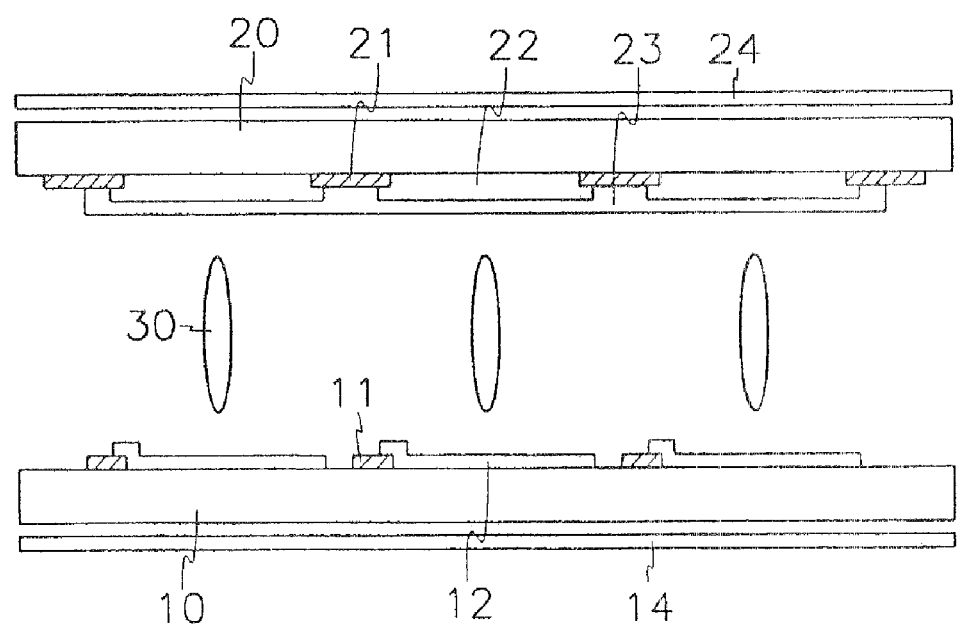
FIG. 2 is a schematic cross sectional view of a liquid crystal display according to a preferred embodiment of the present invention.

FIG. 2 is a schematic cross sectional view of a liquid crystal display according to a preferred embodiment of the present invention.

As shown in FIG. 2, the liquid crystal display includes lower and upper substrates 10 and 20 arranged substantially in parallel with a predetermined gap therebetween. Liquid crystal material is injected between the lower and upper substrates 10 and 20 to form a liquid crystal layer. The liquid crystal material is comprised of liquid crystal molecules 30. A long axis of liquid crystal molecules 30 is oriented normal to the lower and upper substrates 10 and 20. Both the lower and upper substrates 10 and 20 are transparent material such as glass.

The lower substrate 10 is overlaid with a pixel electrode 12 that is connected to a switching element 11 to receive display signals. The pixel electrode 12 is formed of a transparent material such as indium tin oxide (ITO) or indium zinc oxide (IZO), and has an opening pattern (not shown). The switching element 11 is, for example, a thin film transistor, and is connected to a gate line (not shown), which transmits scanning signals, and a data line (not shown), which transmits picture signals. The switching element 11 turns the pixel electrode 12 on and off. A lower polarizer film 14 is attached to an outer surface of the lower substrate 10. In a reflection-type LCD, the pixel electrode 12 is formed of non-transparent material. In this case, the lower polarizer film 14 is not necessary.

An inner surface of the upper substrate 20 is sequentially overlaid with a black matrix 21 that prevents the light leakage, a color filter 22, and a common electrode 23. The common electrode 23 is formed of a transparent material such as ITO or IZO, and has an opening pattern (not shown). A polarizer film 24 is attached to an outer surface of the upper substrate 20. Alternatively, the black matrix 21 or the color filter 22 may be formed on the lower substrate 10.

Figure 3A:
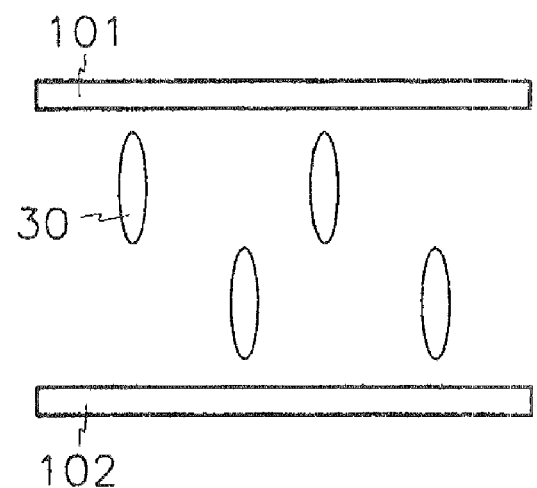
FIG. 3A is a schematic view of opening pattern units formed at common and pixel electrodes according to one example of the present invention.

The LCD can be structured to operate in a normally black mode by arranging the lower polarizer film 14 and the upper polarizer film 24 so that the polarizing directions of each film are perpendicular to each other. It can also be structured to operate in a normally white mode by arranging the polarizing directions of each film to be parallel with each other. In the following description, only the arrangement for a normally black mode will be described. However, the invention can be also applied to the normally white mode. FIG. 3A shows a schematic view of opening patterns of the pixel and common electrodes 12 and 23 according to one example of the present invention. As shown in FIG. 3A, an opening pattern 101 of the pixel electrode 12 and an opening pattern 102 of the common electrode are respectively formed in a straight line. The opening pattern 101 is substantially parallel to the opening pattern 102. With this structure, the liquid crystal molecules 30 are arranged in parallel as a result of a fringe field generated by the opening patterns 101 and 102. Furthermore, the liquid crystal molecules 30 move into the parallel arrangement in a single step, thereby enabling a rapid response speed.

Figure 3B:
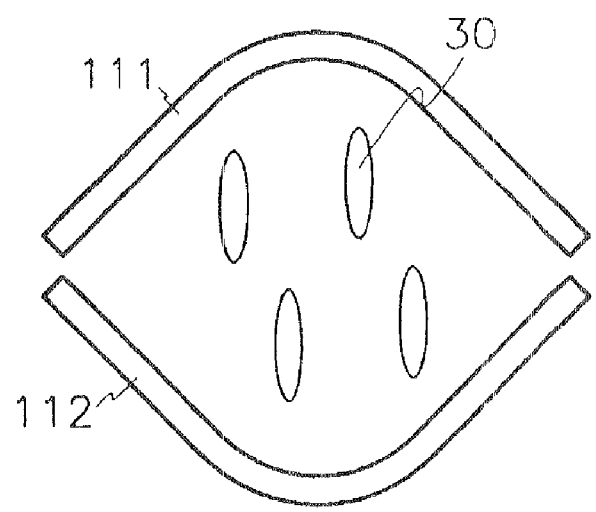
FIG. 3B is a schematic view of opening pattern units formed at common and pixel electrodes according to another example of the present invention.

However, the above structure develops texture over a wide area of the screen. It is also possible that white after-images appear on the screen. When a screen displays a dark color on a bright background and then returns to the color of the bright background, it becomes brighter momentarily than the bright background. It is called as "white after-image". FIG. 3B shows a schematic view of opening patterns of the pixel and common electrodes 12 and 23 according to another example of the present invention.

As shown in FIG. 3B, an opening pattern 111 of pixel electrode 12 and an opening pattern 112 of common electrode 23 are respectively formed in a curved shape. The ends of the opening patterns 111 and 112 are positioned in close proximity and their centers are bulging in opposite directions. However, this structure cannot arrange the liquid crystal molecules 30 in a single step, resulting in a slow response speed.

In the following examples, opening patterns of the pixel and common electrodes 12 and 23 will be described with reference to one pixel area. In a single pixel area, the pixel electrode 12 is substantially rectangular in shape having first and second long sides, respectively corresponding to left and right sides (in the drawings) of the pixel electrode 12. It has first and second short sides, respectively corresponding to top and bottom sides (in the drawings) of the pixel electrode 12. It also has a first corner formed by the ends of the first long side and the first short side, a second corner formed by the ends of the first short side and the second long side, a third corner formed by the ends of the second long side and the second short side, and a fourth corner formed by the ends of the first long side and the second short side. Further, the pixel electrode 12 includes an upper region and a lower region, the upper region corresponding to an upper half (in the drawings) of the pixel electrode 12 and defined by the first long side, the second long side and the first short side, and the lower region corresponding to a lower half (in the drawings) of the pixel electrode 12 and defined by the first long side, the second long side and the second short side.

As the common electrode 23 is present over the entire surface of the upper substrate 20, a portion of the common electrode 23 roughly corresponding to the pixel electrode 12 in one pixel area will be described. Here, such portions of the common electrode 23 will be indicated by a dotted line and the identifying markers (i.e., upper region and lower region; first long side and second long side; first short side and second short side; and first, second, third and fourth corners) used for ease of explanation of the pixel electrode 12, which will also denote these portions of the common electrode 23 defined by the dotted lines.

Figure 4A:
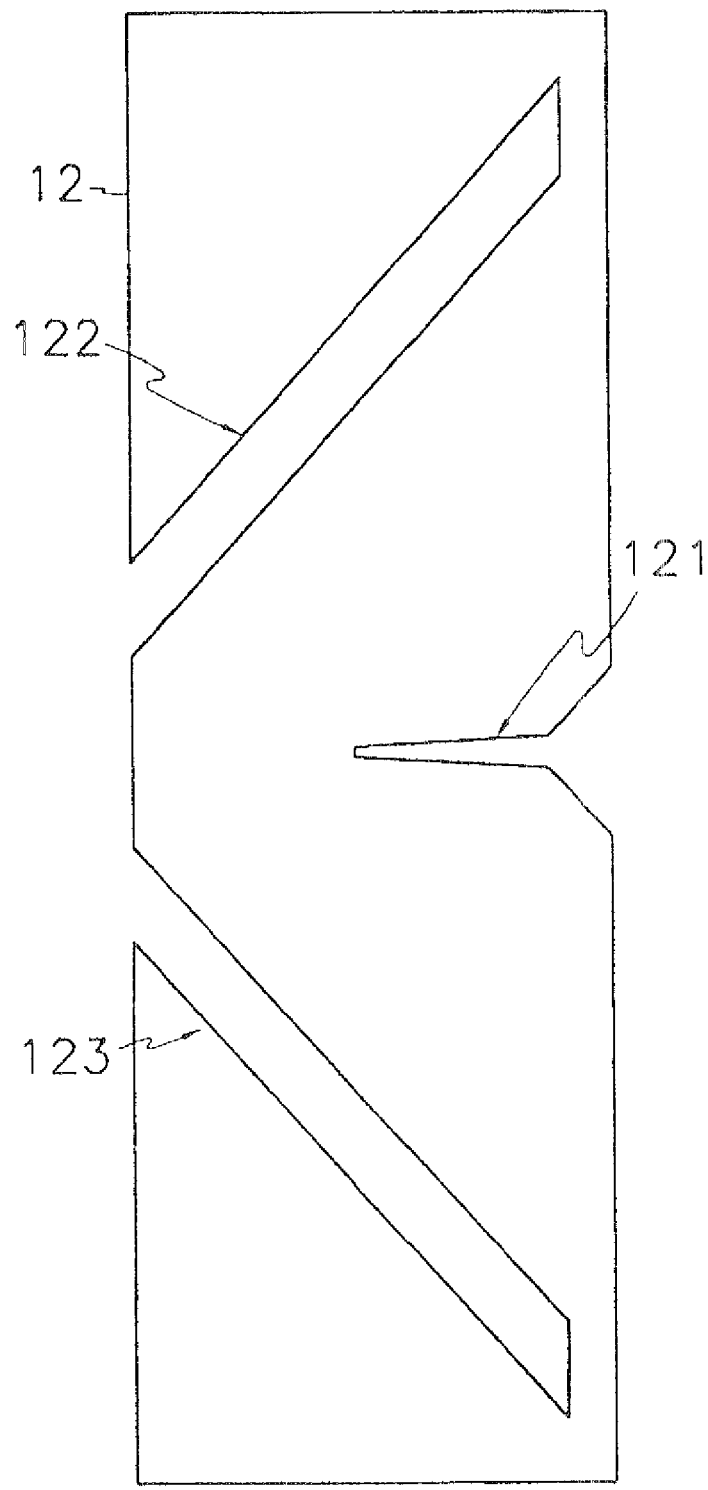
FIG. 4A is a schematic view of an opening pattern of a pixel electrode according to the other example of the present invention.

FIG. 4A shows a schematic view of an opening pattern of the pixel electrode 12 according to the other example of the present invention.

As shown in FIG. 4A, a middle opening 121 is formed inwardly from the first long side where the upper and lower regions of the pixel electrode 12 meet. The middle opening 121 extends a predetermined distance toward the second long side while being tapered. The first long side is cut at a predetermined angle on both sides of the middle opening 121, forming a wide inlet area of the middle opening 121. Upper and lower openings 122 and 123 are formed in the upper and lower regions of the pixel electrode 12, respectively, proceeding from the second long side at a predetermined angle respectively toward the first and fourth corners of the pixel electrode 12 in a symmetrical manner.

Figure 4B:
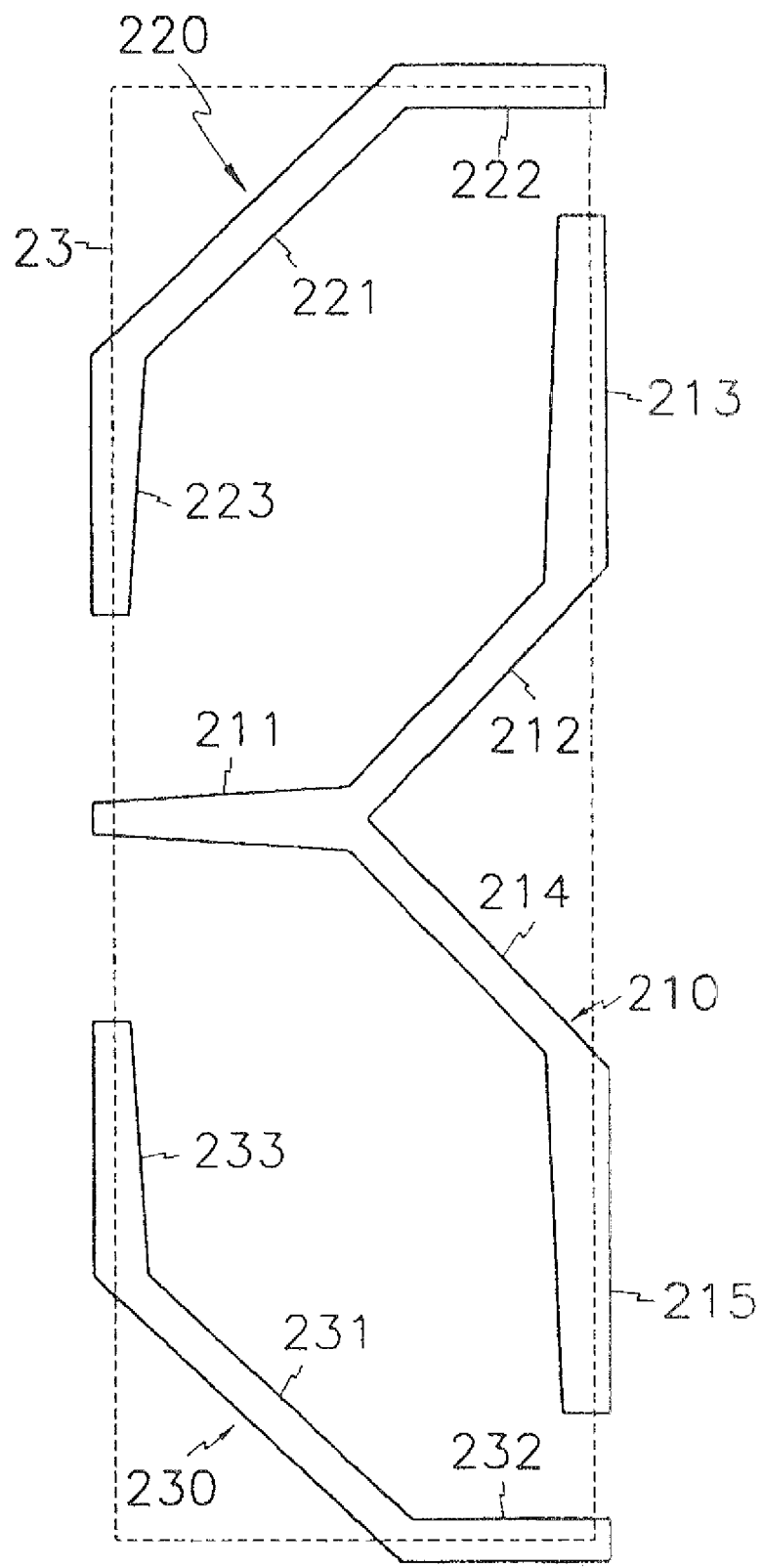
FIG. 4B is a schematic view of an opening pattern of a common electrode according to the other example of the present invention.

FIG. 4B shows a schematic view of an opening pattern of the common electrode 23 according to the other example of the present invention.

As shown in FIG. 4B, the opening pattern of the common electrode 23 includes middle, upper and lower openings 210, 220 and 230 respectively spaced apart from the other at predetermined distances. The middle opening 210 includes a trunk 211 positioned where the upper and lower regions of the common electrode 23 meet and proceeding from the second long side a predetermined distance toward the first long side. First and second branches 212 and 214 are extended at a predetermined angle from the trunk 211 toward the first long side, and first and second sub-branches 213 and 215 extend along the first long side respectively from the first and second branches 212 and 214, toward the first and second short sides, respectively. The upper opening 220, which is formed in the upper region of the common electrode 23, includes a first body 221 that is formed extended from the second long side to the first short side at a predetermined distance from the second corner and parallel to the first branch 212. A first upper limb 222 extends from an end of the first body 221 along the first short side and until reaching the first long side, and a first lower limb 223 extends from an opposite end of the first body 221 along the second long side toward the second short side. The lower opening 230 includes a second body 231, a second lower limb 232, and a second upper limb 233. The lower opening 230 is arranged in the lower region and is symmetrical to the upper opening 220.

Figure 4C:
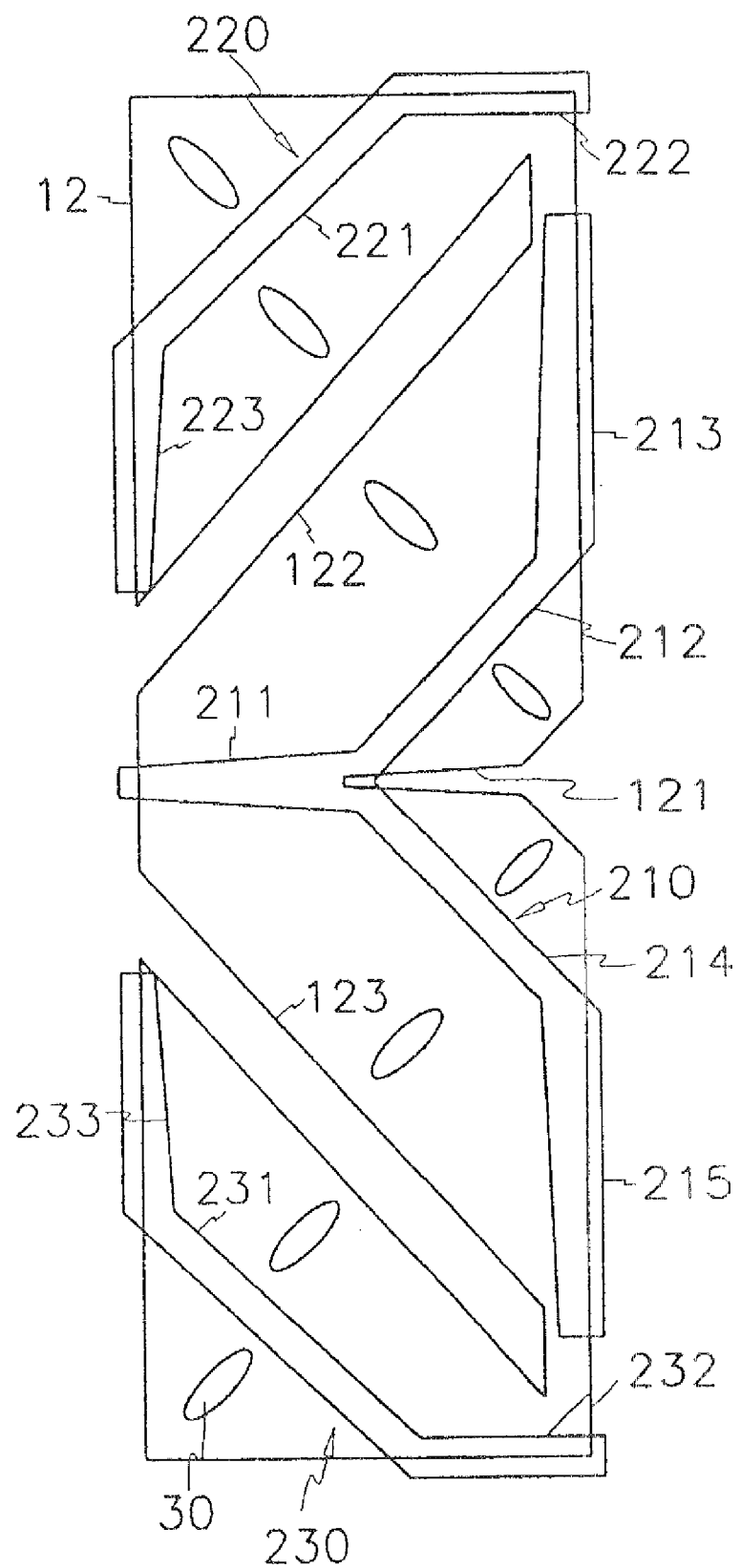
FIG. 4C is a schematic view of the opening patterns of the pixel and common electrodes shown respectively in FIGS. 4A and 4B in an overlapped state.

FIG. 4C shows a schematic view of the opening patterns of the pixel and common electrodes 12 and 23 shown respectively in FIGS. 4A and 4B in an overlapped state.

As shown in FIG. 4C, the opening patterns of the pixel and common electrodes 12 and 23 divide the pixel electrode 12 into several regions. The openings 121, 122 and 123 of the pixel electrode 12 and the openings 210, 220 and 230 of the common electrode 23 are alternately arranged except where the trunk 211 of the middle opening 210 of the common electrode partially overlaps the middle opening 121 of the pixel electrode 12.

In this preferred embodiment, the lower and upper polarizer films 14 and 24 are arranged such that their polarizing directions are respectively 0° and 90° (or vice versa) with respect to the first and second short sides of the pixel electrode 12. With such an arrangement, when the liquid crystal molecules 30 are rearranged under the application of an electric field, they cannot be oriented in the polarizing direction of the polarizer films 14 and 24, without causing the texture problems. Furthermore, as the liquid crystal molecules 30 are fully oriented in parallel under the influence of the fringe field, the movement of the liquid crystal molecules 30 is completed in one step, resulting in a rapid response speed.

In addition, the opening portions of the pixel and common electrodes 12 and 23 are arranged generally in two directions normal to each other. Since the opening portions of the pixel and common electrodes 12 and 23 are alternately arranged, the fringe field is applied in four directions at one pixel area. Therefore, wide viewing angles can be obtained in all directions.

Figure 5A:
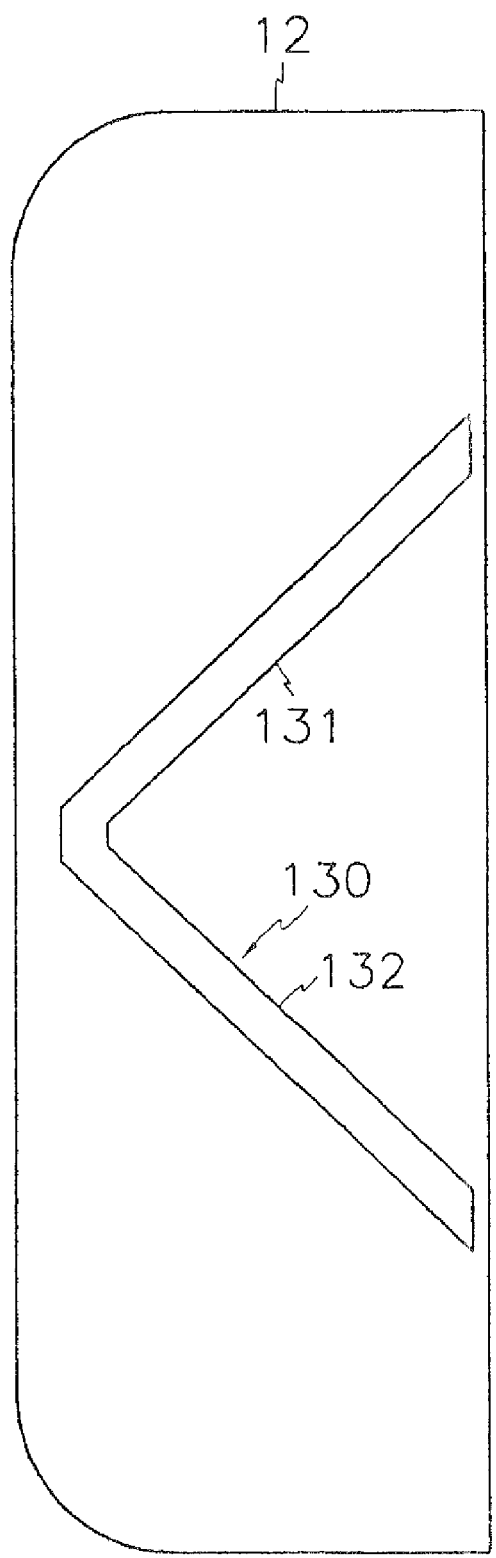
FIG. 5A is a schematic view of all opening pattern of a pixel electrode according to the other example of the present invention.

FIG. 5A shows a schematic view of an opening pattern of the pixel electrode 12 according to the other example of the present invention. As shown in FIG. 5A, the opening pattern of the pixel electrode 12 is a V-shaped opening 130. The V-shaped opening 130 has a vertex in proximity to the second long side and positioned where the upper region meets the lower region of the pixel electrode 12, and opens toward the first long side of the pixel electrode 12. That is, an upper half 131 of the opening 130 extends at a predetermined angle from the vertex of the opening 130 toward the first long side of the pixel electrode 12 such that the upper half 131 is positioned wholly in the upper region of the pixel electrode 12, and a lower half 132 of the opening 130 extends at a predetermined angle from the vertex of the opening 130 toward the first long side of the pixel electrode 12 such that the lower half 132 is positioned wholly in the lower region of the pixel electrode 12. Further, the second and third corners of the pixel electrode 12 are cut away to form a curved shape.

Figure 5B:
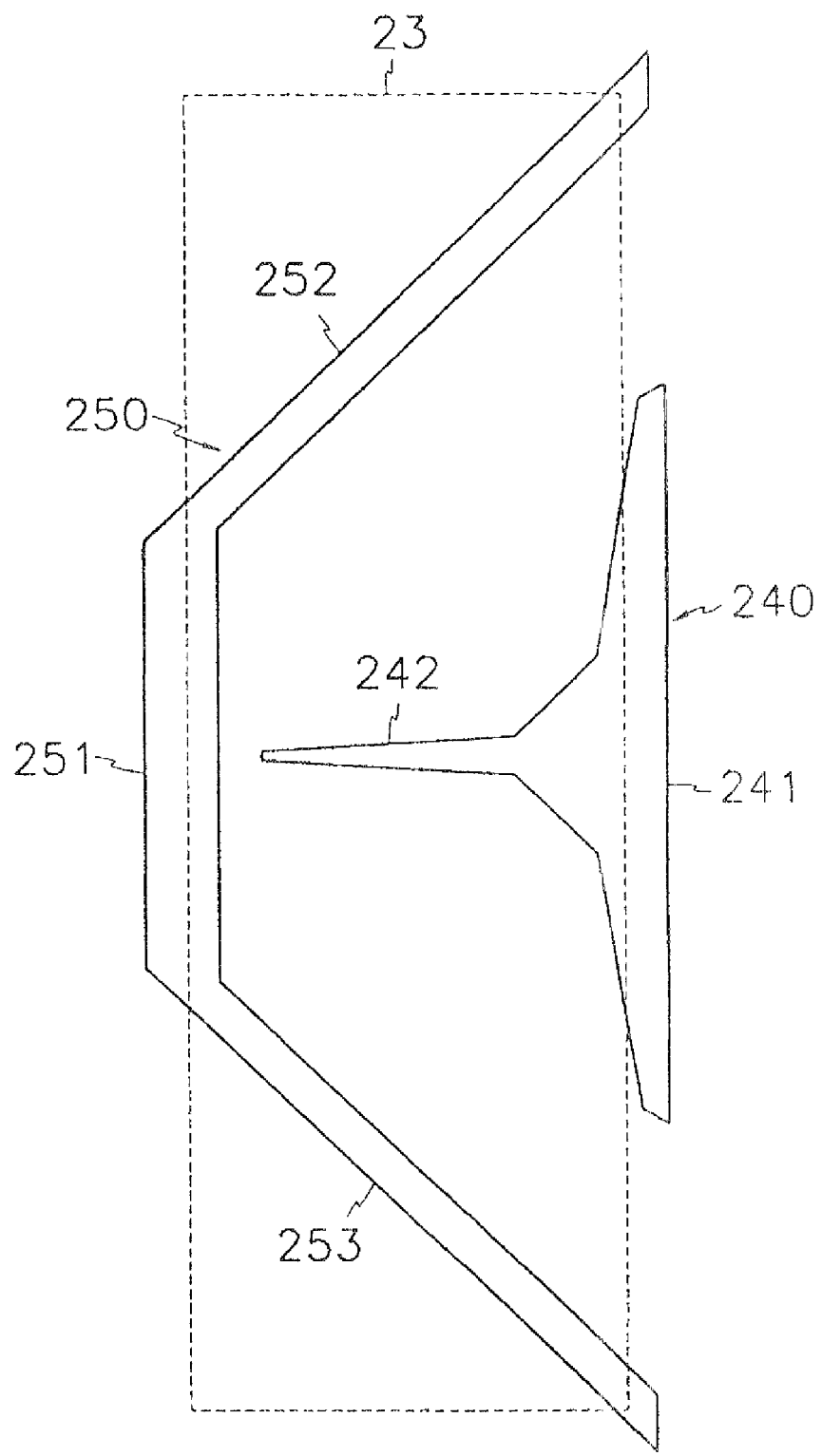
FIG. 5B is a schematic view of an opening pattern of a common electrode according to the other example of the present invention.

FIG. 5B shows a schematic view of an opening pattern of the common electrode 23 according to the other example of the present invention.

As shown in FIG. 5B, the opening pattern of the common electrode 23 includes a right opening 240 and a left opening 250. The right opening 240 includes a base 241 formed along and extending past the first long side of the common electrode 23, and tapers from a middle portion along the first long side toward the first and second short sides. The base 241 of the right opening 240 also includes a projection 242 extending a predetermined distance from the base 241 toward the second long side and tapered in the same direction. A portion of the projection 242 adjacent to the base 241 is formed at a predetermined slant. The left opening 250 includes a body 251 formed along the second long side of the common electrode 23, an upper limb 252 extended at a predetermined angle from one end of the body 251 toward and continuing past the first corner of the common electrode 23, and a lower limb 253 extended at a predetermined angle from the other end of the body 251 toward and continuing past the fourth corner of the common electrode 23. Centers of both the right and left openings 240 and 250 are positioned where the upper and lower regions of the, common electrode 23 meet.

Figure 5C:
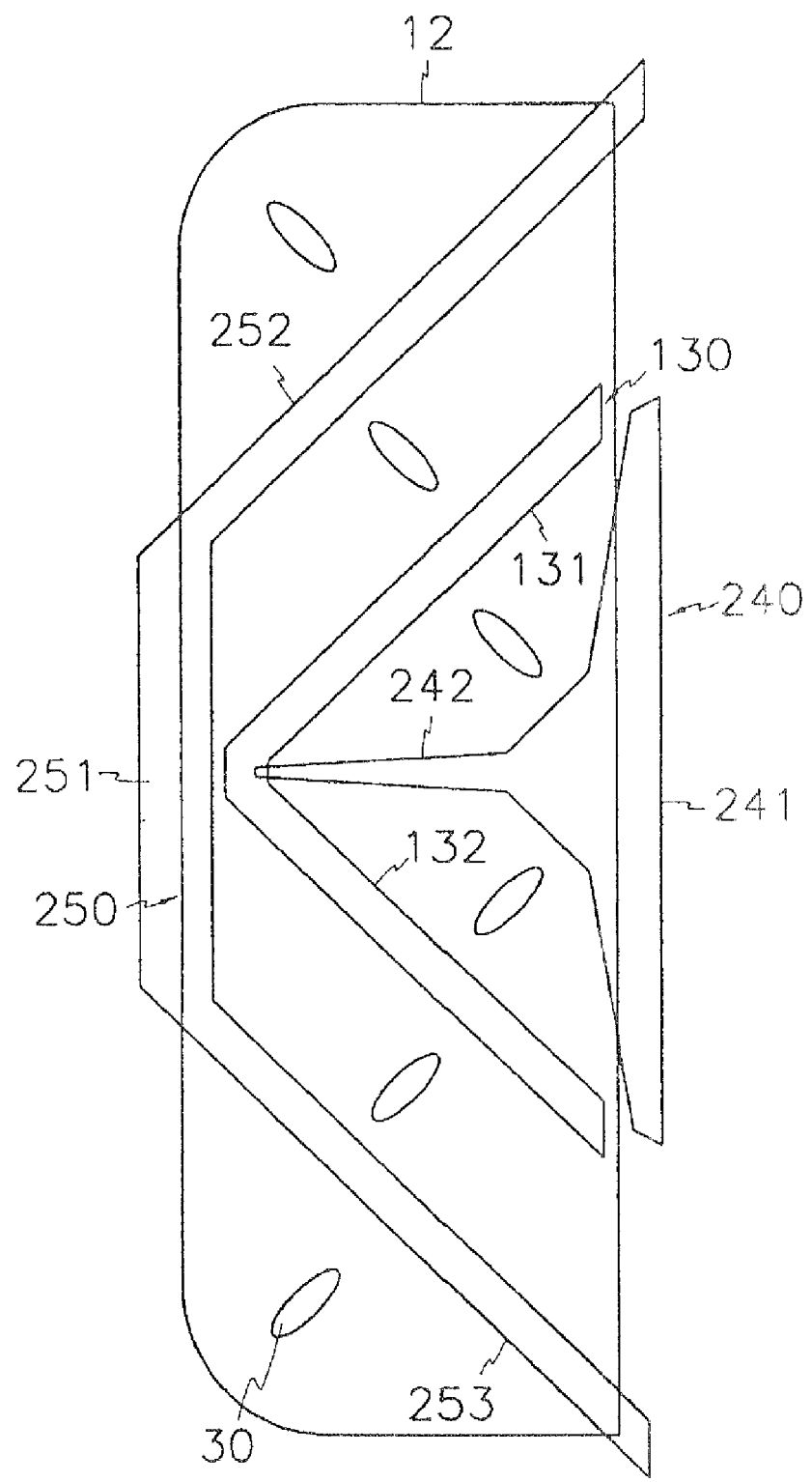
FIG. 5C is a schematic view of the opening patterns of the pixel and common electrodes shown respectively in FIGS. 5A and 5B in an overlapped state.

FIG. 5C shows a schematic view of the, opening patterns of the pixel and common electrodes 12 and 23 shown respectively in FIGS. 5A and 5B in an overlapped state.

As shown in FIG. 5C, the opening patterns of the, pixel and common electrodes 12 and 23 divide the pixel electrode 12 into several regions. The V-shaped opening 130 of the pixel electrode 12 is placed between the right and left openings 240 and 250 of the common electrode 23. The upper and lower parts 131 and 132 of the, V-shaped opening 130 proceed in parallel to the lower and upper limbs 252 and 253 of the left opening 250, respectively, as well as to the portion of the projection 242 adjacent to the base 241 of the right opening portion 240. An end of the projection 242 overlaps the vertex of the V-shaped opening portion 130. With the configuration of this example of the present invention as described above, the lower and upper polarizer films 14 and 24 are arranged such that their polarizing directions are the same as the previous example.

Figure 6A:
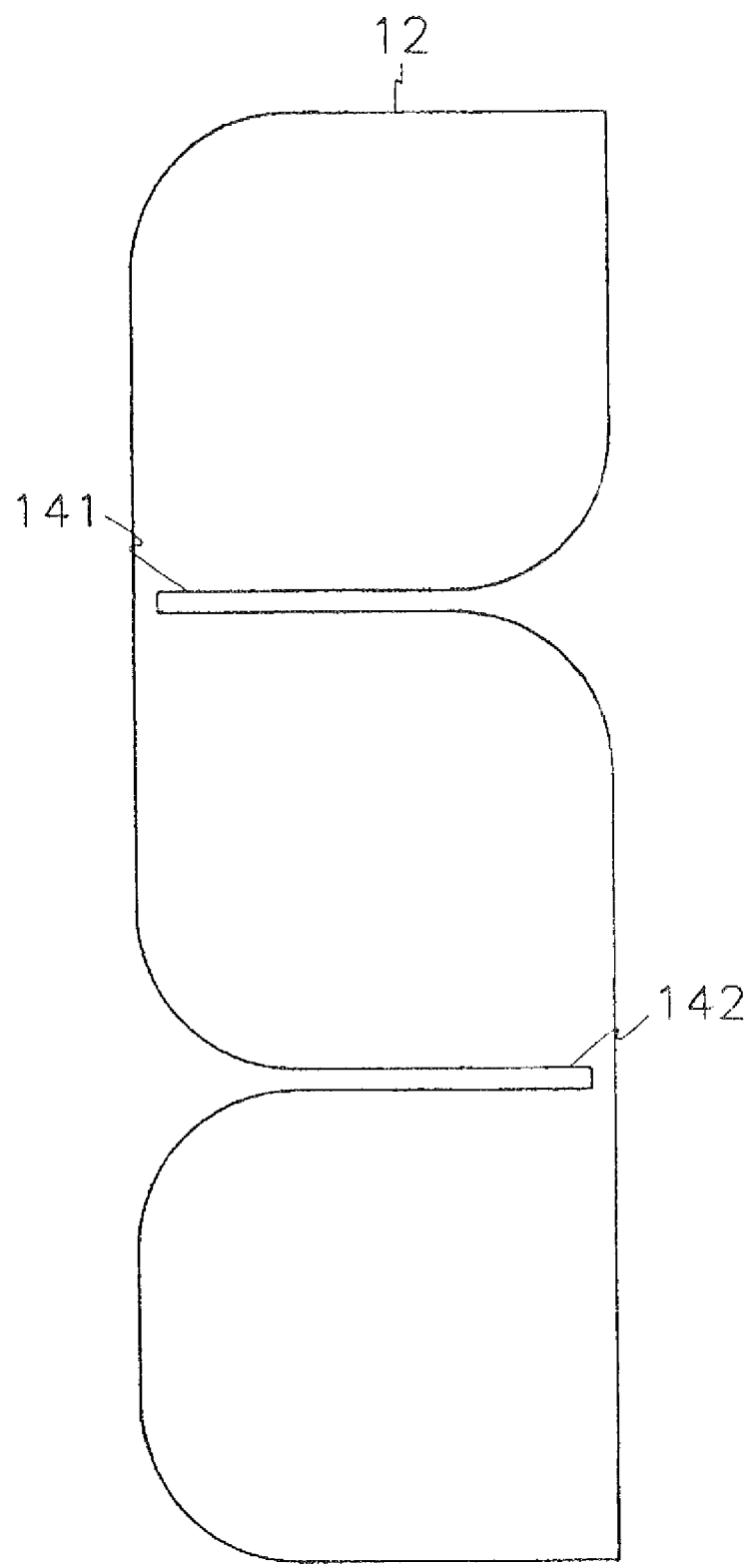
FIG. 6A is a schematic view of an opening pattern of a pixel electrode according to the other example of the present invention.

FIG. 6A shows a schematic view of an opening pattern of the pixel electrode 12 according to a fifth preferred embodiment of the present invention. As shown in FIG. 6A, the opening pattern of the pixel electrode 12 includes an upper opening 141 formed in the upper region of the pixel electrode 12, and a lower opening 142 formed in the lower region of the pixel electrode. If the pixel electrode 12 is divided into three areas of equal length, that is, first to third areas, with the first area having as its one side the first short side, the third area having as its one side the second short side, and the second area being formed between the first and third areas, the upper opening 141 is positioned where the first and second areas meet, and the lower opening 142 is positioned where the second and third areas meet. The upper opening 141 extends from the first long side to the second long side of the pixel electrode 12 in the horizontal directions and areas of the pixel electrode 12 corresponding to where the upper opening 141 is positioned along the first long side are cut away to form a curved shape. Similarly, the lower opening 142 extends from the second long side to the first long side of the pixel electrode 12 in the horizontal direction. Areas of the pixel electrode 12 corresponding to where the lower opening 142 is positioned along the second long side are cut away to form a curved shape. In addition, second and third corners of the pixel electrode 12 are cut such that they are rounded.

Figure 6B:
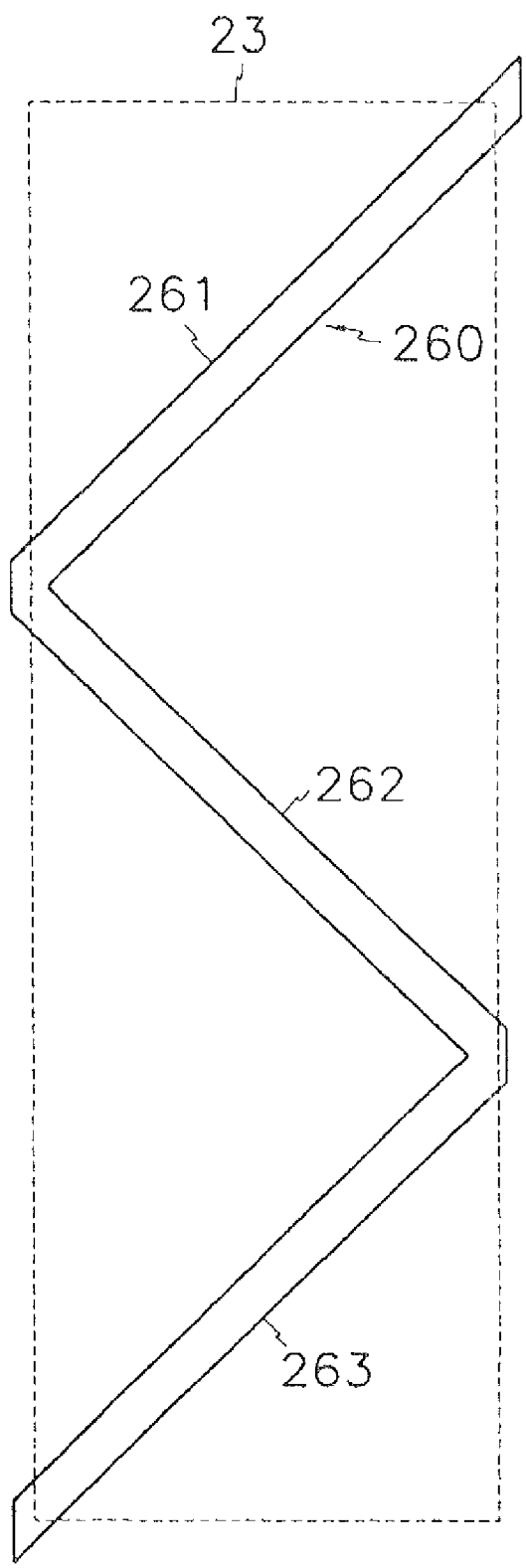
FIG. 6B is a schematic view of an opening pattern of a common electrode according to the other example of the present invention.

FIG. 6B shows a schematic view of an opening pattern of the common electrode 23 according to a fifth preferred embodiment of the present invention.

As shown in FIG. 6B, the opening pattern of the common electrode 23 is a zigzag-shaped opening 260. The zigzag-shaped opening 260 includes an upper part 261 proceeding from the first corner of the common electrode 23 at a predetermined slant toward and meeting the second long side of the common electrode 23. A middle part 262 extends at a predetermined slant from an end of the upper part 261 where the same meets the second long side toward and meeting the first long side of the common electrode 23. And a lower part 263 extends at a predetermined slant from an end of the middle part 262 where the same meets the first long side toward and meeting the third corner of the common electrode 23. If the common electrode 23 is divided into three areas of equal length, that is, first to third areas, with the first area having as its one side the first short side, the third area having as its one side the second short side, and the second area being formed between the first and third areas, the upper and middle parts 261 and 262 converge where the first and second areas meet, and the middle and lower parts 262 and 263 converge where the second and third areas meet.

Figure 6C:
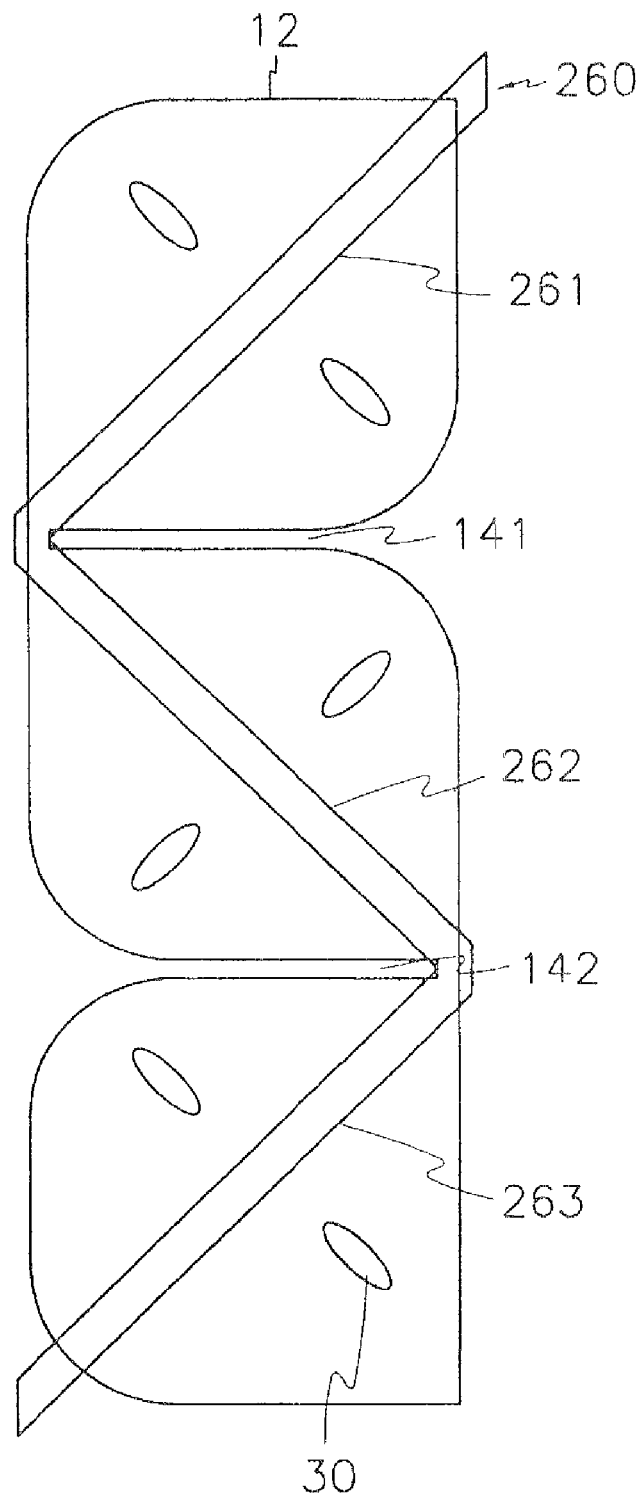
FIG. 6C is a schematic view of the opening patterns of the pixel and common electrodes shown respectively in FIGS. 6A and 6B in an overlapped state.

FIG. 6C shows a schematic view of the opening patterns of the pixel and common electrodes 12 and 23 shown respectively in FIGS. 6A and 6B in an overlapped state.

As shown in FIG. 6C, the opening patterns of the pixel and common electrodes 12 and 23 divide the pixel electrode 12 into several regions. The portion where the upper and middle parts 261 and 262 of the opening 260 of the common electrode 23 meet overlaps an end of the upper opening portion 141 of the pixel electrode 12 adjacent to the second long side, and the portion where the middle and lower parts 262 and 263 of the opening 260 of the common electrode 23 meet overlaps an end of the lower opening portion 142 of the pixel electrode 12 adjacent to the first long side.

With the configuration of the example of the present invention as described above, the lower and upper polarizer films 14 and 24 are arranged such that their polarizing directions are the same as in the previous examples.

Figure 7A:
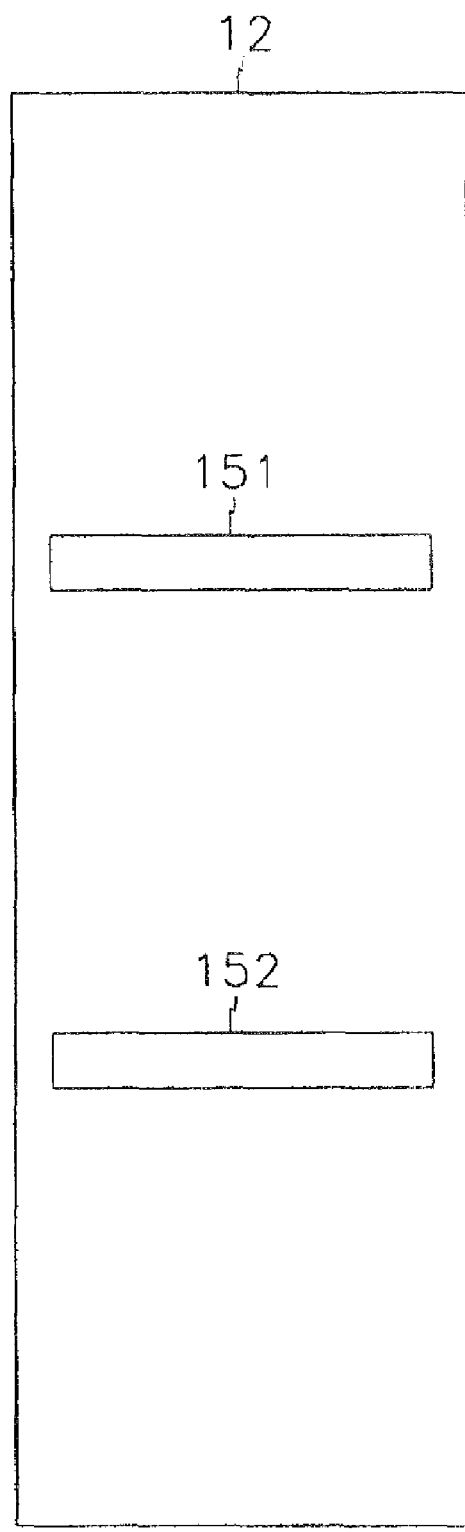
FIG. 7A is a schematic view of an opening pattern of a pixel electrode according to the other example of the present invention.

FIG. 7A shows a schematic view of an opening pattern of the pixel electrode 12 according to the other example of the present invention.

As shown in FIG. 7A, the opening pattern of the pixel electrode 12 includes an upper opening 151 formed parallel to the first and second short sides in the upper region of the pixel electrode 12, and a lower opening 152 also formed parallel to the first and second short sides in the lower region of the pixel electrode 12, if the pixel electrode 12 is divided into three areas of equal length, that is, first to third areas, with the first area having as its one side the first short side, the third area having as its one side the second short side, and the second area being formed between the first and third areas, the upper opening 151 is positioned where the first and second areas meet, and the lower opening portion 152 positioned where the second and third areas meet. The upper and lower openings 151 and 152 extend from a position in proximity to the first long side to a position in proximity to the second long side.

Figure 7B:
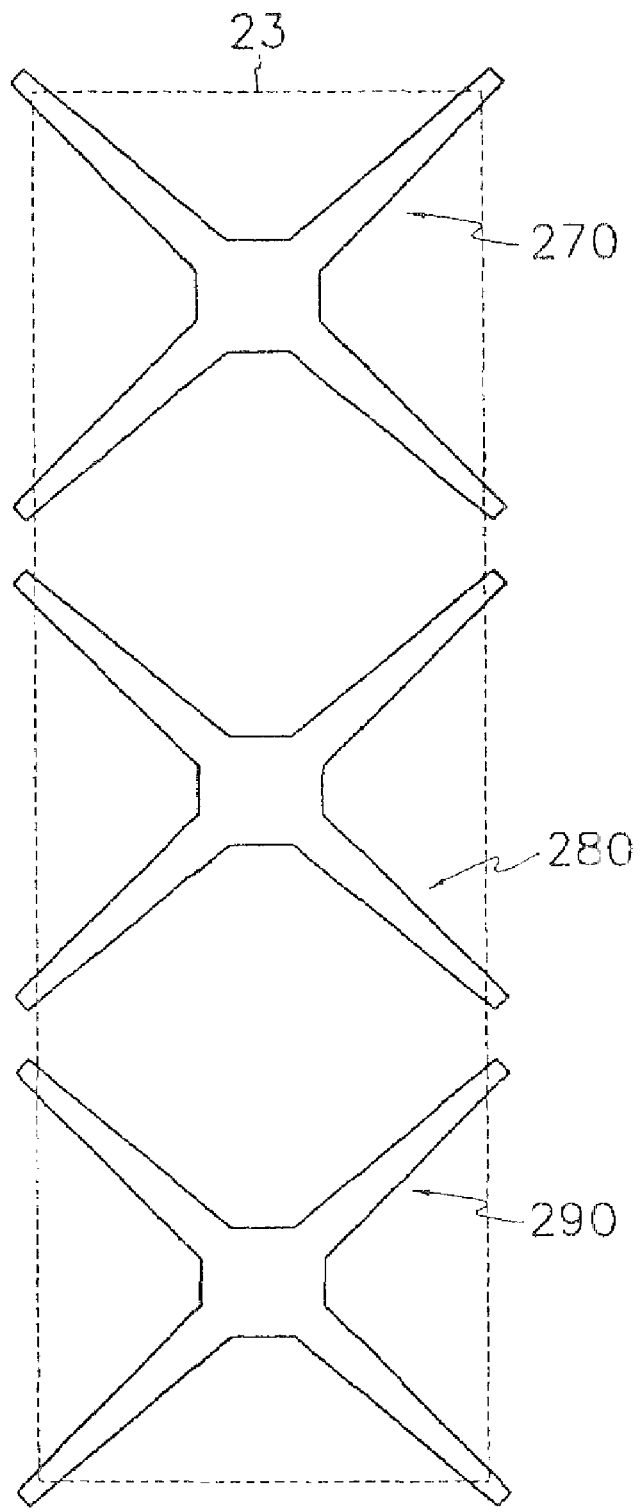
FIG. 7B is a schematic view of an opening pattern of a common electrode according to the other example of the present invention.

FIG. 7B shows a schematic view of an opening pattern of the common electrode 23 according to a sixth preferred embodiment of the present invention.

As shown in FIG. 7B, the opening pattern of the common electrode 23 includes first, second and third X-shaped openings 270, 280 and 290 spaced apart from each other at a predetermined distance along the length of the common electrode 23. A center area of each of the X-shaped openings 270, 280 or 290) is cut away to form an enlarged area approximately rectangular in shape. One line forming the "X" of the first X-shaped opening 270 extends from the first corner to the second long side of the common electrode 23 and its other line extends from the second corner to the first long side of the common electrode 23. Likewise, one line forming the "X" of the second X-shaped opening 280 extends from the first long side to the second long side of the common electrode 23 and its other line extends from the second long side to the first long side of the common electrode 23. In the same manner, one line forming the "X" of the third X-shaped opening 290 extends from the second long side to the fourth corner of the common electrode 23 and its other line extends from the first long side to the third corner of the common electrode 23.

Figure 7C:
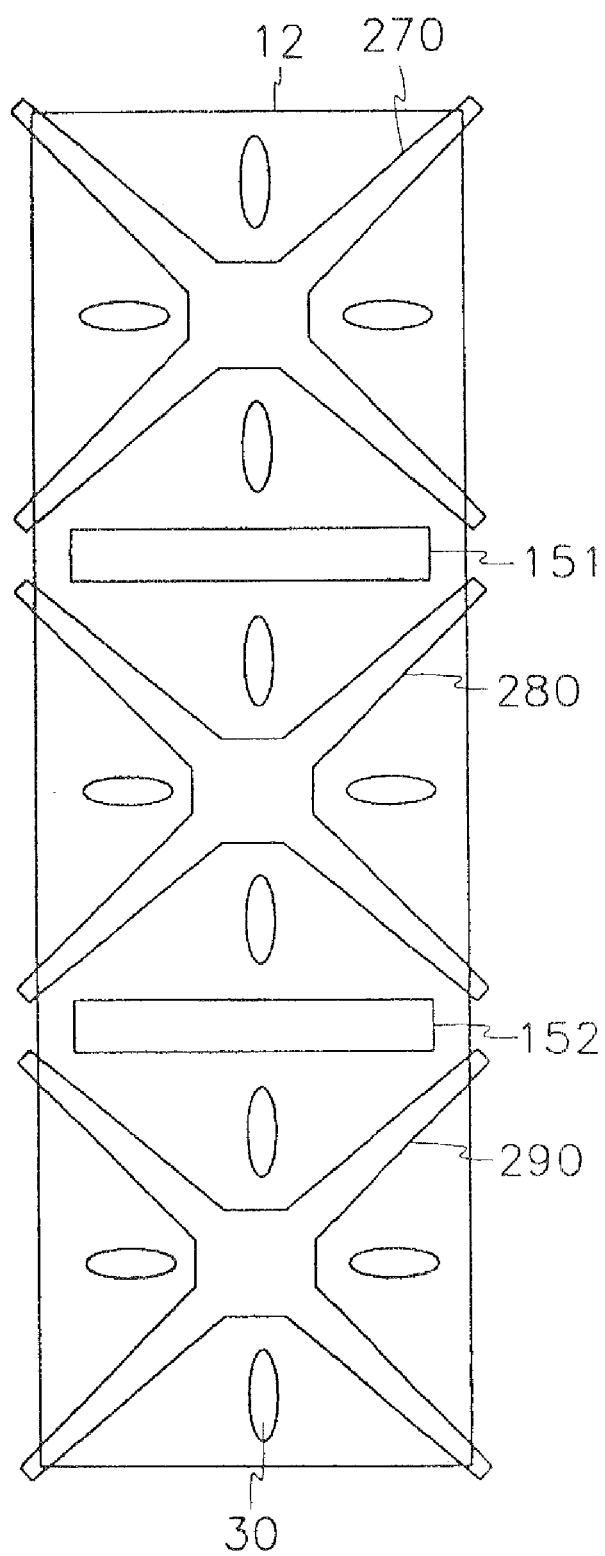
FIG. 7C is a schematic view of the opening patterns of the pixel and common electrodes shown respectively in FIGS. 7A and 7B in an overlapped state.

FIG. 7C shows a schematic view of the opening patterns of the pixel and common electrodes 12 and 23 shown respectively in FIGS. 7A and 7B in an overlapped state.

As shown in FIG. 7C, the opening patterns of the pixel and common electrodes 12 and 23 are alternately arranged, and divide the pixel electrode 12 into several regions.

With the configuration of this example of the present invention as described above, the lower and upper polarizer films 14 and 24 are arranged such that their polarizing directions are respectively 45° and 135° (or vice versa) with respect to the first and second short sides of the pixel electrode 12.

Figure 8A:
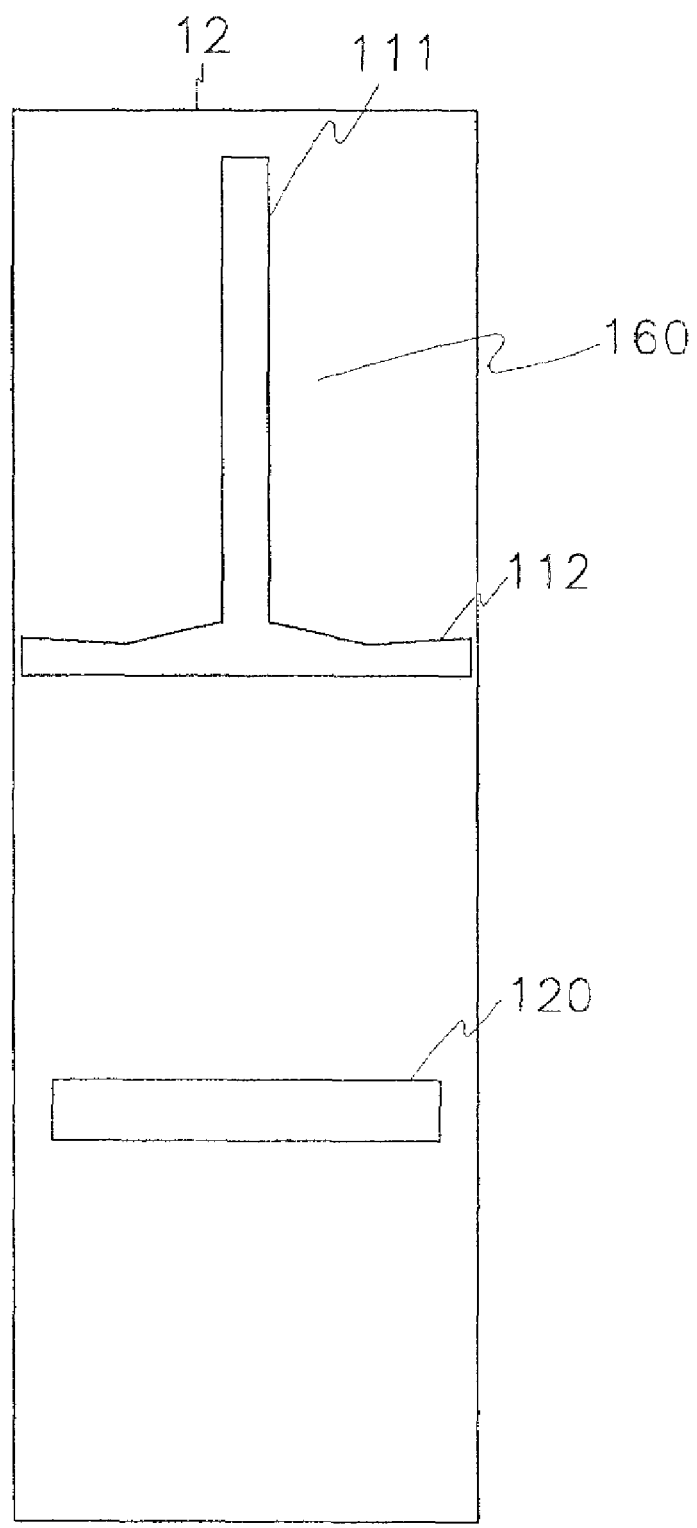
FIG. 8A is a schematic view of an opening pattern of a pixel electrode according to the other example of the present invention.

FIG. 8A shows a schematic view of an opening pattern of the pixel electrode 12 according to the other example of the present invention.

As shown in FIG. 8A, the opening pattern of the pixel electrode 12 includes an upper opening 160 formed in the upper region of the pixel electrode 12, and a lower opening 170 formed in the lower region of the pixel electrode 12. The upper opening 160 is T-shaped. That is, the upper opening 160 has a base 161 (the top of the "T") formed at a predetermined distance from where the upper and lower regions of the pixel electrode 12 meet. The base 161 extending from approximately the first long side to the second long side of the pixel electrode 12. The upper opening 160 also has a protrusion 162 extending substantially from a center of the base 161 in a direction toward the first short side of the pixel electrode 12, thereby bisecting the upper region of the pixel electrode 12 into left and right sub-areas. The lower opening 170 is formed parallel to the base 161 of the upper opening 160 and extends across the pixel electrode 12 approximately and at predetermined distances from the first long side to the second long side of the pixel electrode 12 such that the lower opening 170 bisects the lower region of the pixel electrode 12 into upper and lower sub-areas.

Figure 8B:
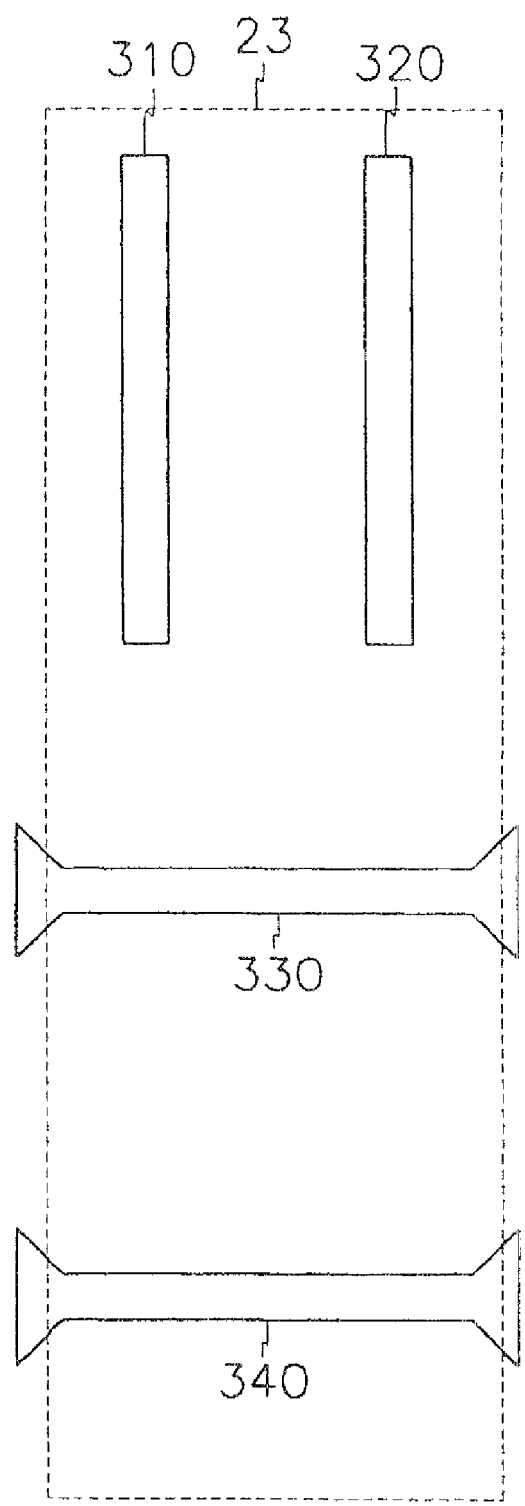
FIG. 8B is a schematic view of an opening pattern of a common electrode according to the other example of the present invention.

FIG. 8B shows a schematic view of an opening pattern of the common electrode 23 according to the other example of the present invention.

As shown in FIG. 8B, the opening pattern of the common electrode 23 includes two upper openings 310 and 320, a middle opening 330, and a lower opening 340. The two upper openings 310 and 320 are spaced apart from each other at a predetermined distance in the upper region of the common electrode 23, and are parallel to each other as well as to the first and second long sides of the common electrode 23. The middle and lower openings 330 and 340 are spaced apart from each other at a predetermined distance in the lower region of the common electrode 23, and are parallel to each other and to the first and second short sides of the common electrode 23. Both end portions of the middle and lower openings 330 and 340 are enlarged in roughly a triangular shape, and the triangle-shaped end portions of the middle and lower opening portions 330 and 340 proceed over the first and second long sides of the common electrode 23.

Figure 8C:
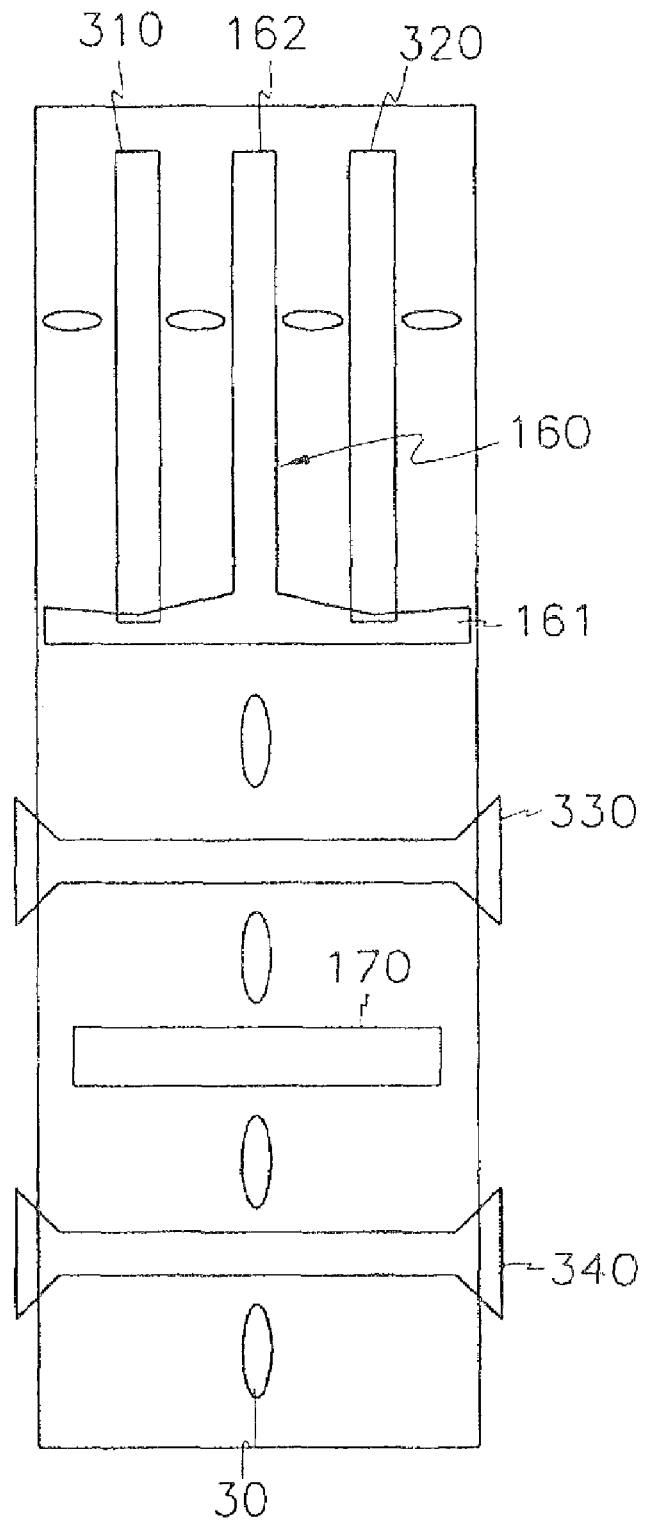
FIG. 8C is a schematic view of the opening patterns of the pixel and common electrodes shown respectively in FIGS. 8A and 8B in an overlapped state.

FIG. 8C shows a schematic view of the opening patterns of the pixel and common electrodes 12 and 23 shown respectively in FIGS. 8A and 8B in an overlapped state.

As shown in FIG. 8C, the opening patterns of the pixel and common electrodes 12 and 23 divide the pixel electrode 12 into several regions. That is, ends of the upper opening portions 310 and 320 of the common electrode 23 farthest from the first short side of the common electrode 23 overlap the base 161 of the T-shaped opening 160 of the pixel electrode 12. Accordingly, the upper openings 310 and 320 of the common electrode 23, and the protrusion 162 of the T-shaped opening 160 of the pixel electrode 12 divide an area of the pixel electrode 12 defined by the base 161 of the T-shaped opening 160, the first and second long sides of the pixel electrode 12, and the first short side of the pixel electrode 12 into four sub-areas. The middle and lower openings 330 and 340 of the common electrode 23, and the lower opening 170 of the pixel electrode 12 divide an area of the pixel electrode 12 defined by the base 161 of the T-shaped opening 160, the first and second long sides of the pixel electrode 12, and the second short side of the pixel electrode 12 into four sub-areas.

With the configuration of this example of the present invention as described above, the lower and upper polarizer films 14 and 24 are arranged such that their polarizing directions are the same as in the immediate previous example. Accordingly, the orienting direction of the liquid crystal molecules 30 becomes 45° with respect to the polarizing direction of the polarizer films 14 and 24 so that the response speed is rapid and the texture is decreased, resulting in enhanced picture quality. The opening portions of the pixel and common electrodes 12 and 23 proceed generally in two directions normal to each other. Furthermore, as the opening portions of the pixel and common electrodes 12 and 23 are alternately arranged, the fringe field in one pixel area is applied in all directions.

Figure 9A:
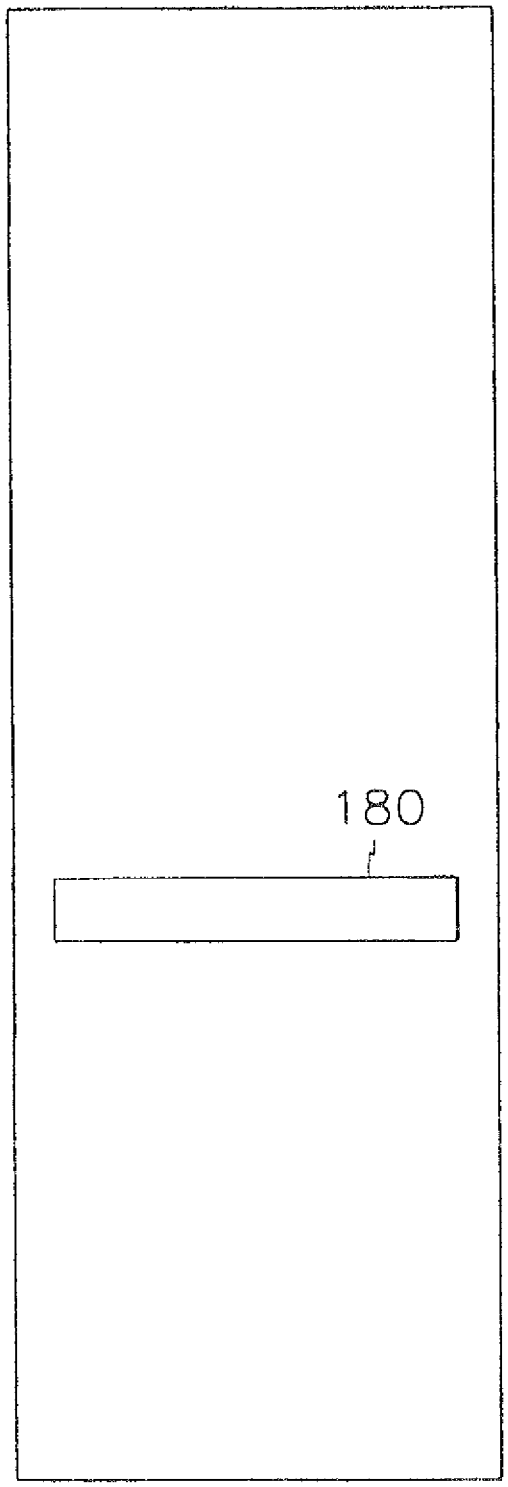
FIG. 9A is a schematic view of an opening pattern of a pixel electrode according to the other example of the present invention.

FIG. 9A shows a schematic view of an opening pattern of the pixel electrode 12 according to the other example of the present invention. As shown in FIG. 9A, the opening pattern of the pixel electrode 12 is a single linear opening 180 parallel to the first and second short sides of the pixel electrode 12. If the pixel electrode 12 is divided into three areas of equal length, that is, first to third areas, with the first area having as its one side the first short side, the third area having as its one side the second short side, and the second area being formed between the first and third areas, the linear opening 180 is positioned where the second and third areas meet.

Figure 9B:
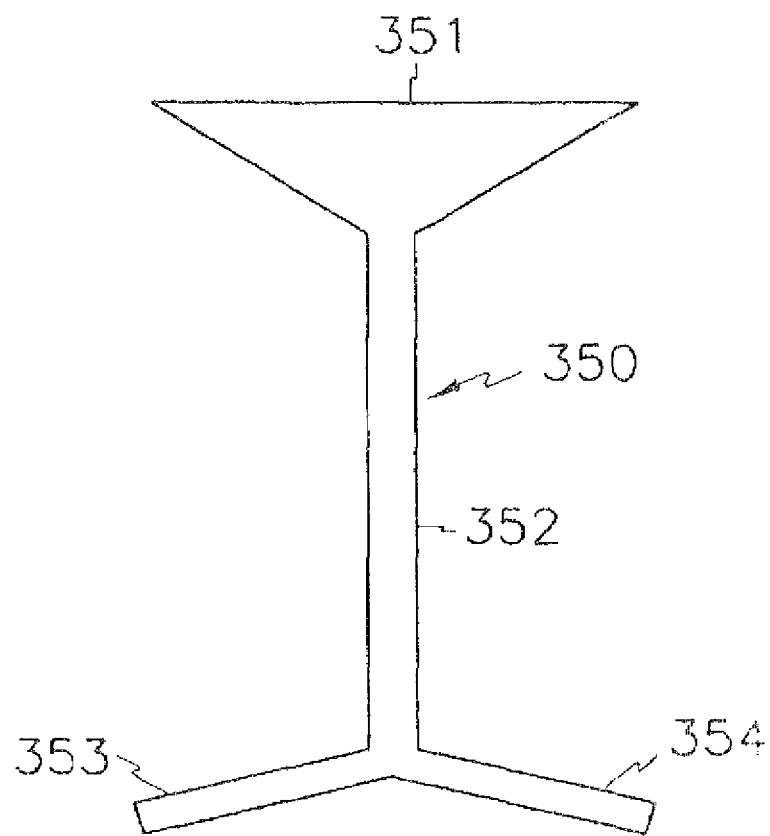
FIG. 9B is a schematic view of an opening pattern of a common electrode according to the other example of the present invention.
Figure 9B:
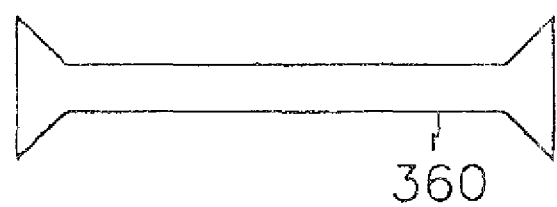

FIG. 9B shows a schematic view of an opening pattern of the common electrode 23 according to the other example of the present invention.

As shown in FIG. 9B, the opening pattern of the common electrode 23 includes an upper opening 350 formed in the upper region of the common electrode 23 and a lower opening 360 formed in the lower region of the common electrode. The upper opening 350 includes a base 351, a trunk 352, and two branches 353 and 354. The base 351 of the upper opening 350 is formed roughly in a triangular shape and positioned extending over and past the first short side of the common electrode 23, The trunk 352 is linearly extended from an apex of the base 351 in a direction toward the second short side of the common electrode 23. The branches 353 and 354 are branched from a distal end of the trunk 352 toward and extending over the first and second long sides of the common electrode 23, each of the branches 353 and 354 forming an obtuse angle with respect to the trunk 352. The lower opening 360 linearly proceeds in a direction parallel to the first and short sides of the common electrode 23. Both ends of the lower opening 360 are enlarged in roughly a triangular shape and extend over the first and second long sides of the common electrode 23.

Figure 9C:
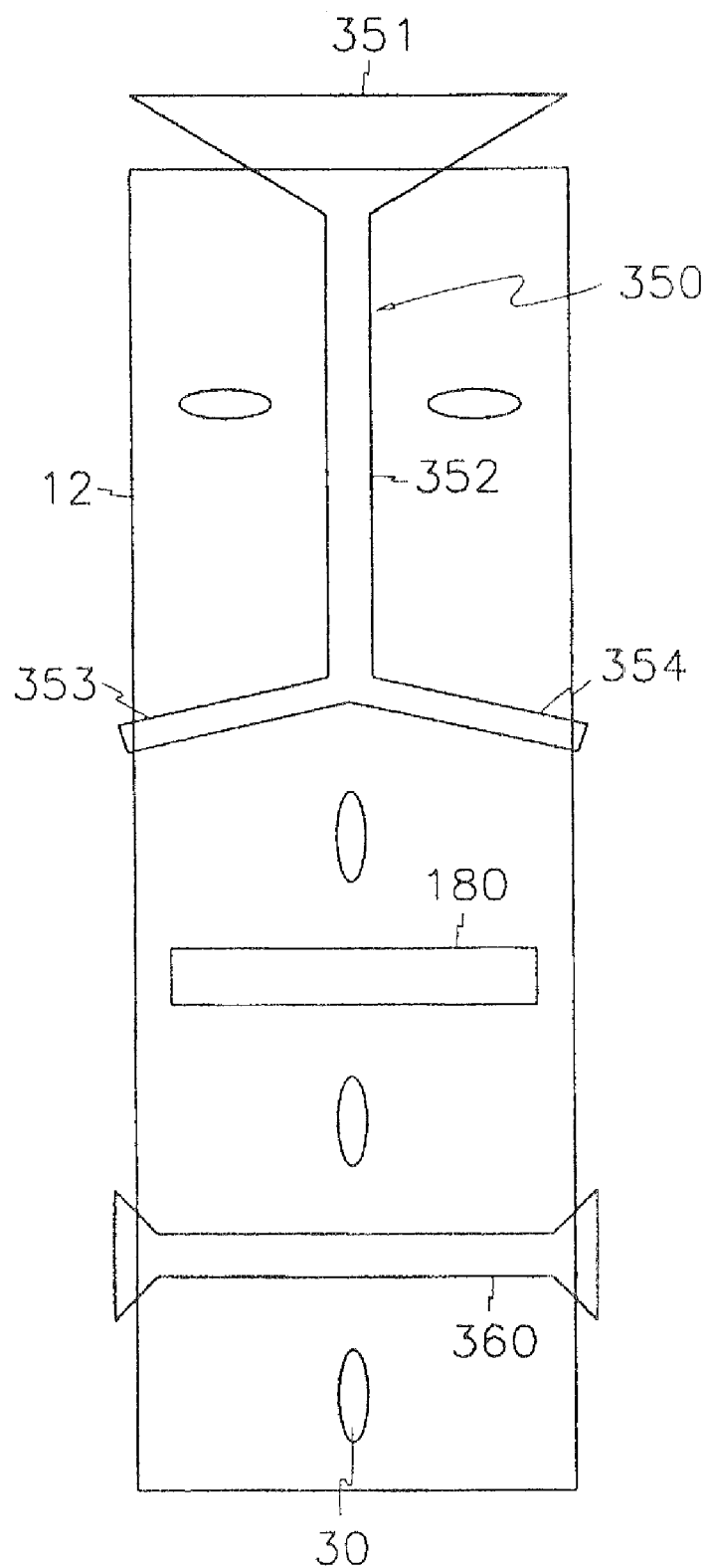
FIG. 9C is a schematic view of the opening patterns of the pixel and common electrodes shown respectively in FIGS. 9A and 9B in an overlapped state.

FIG. 9C shows a schematic view of the pixel and common electrodes 12 and 23 shown respectively in FIGS. 9A and 9B in an overlapped state.

As shown in FIG. 9C, the branches 353 and 354 of the upper opening 350 of the common electrode 23 roughly divide the pixel electrode 12 into upper and lower areas. The trunk 352 of the upper opening 350 of the common electrode 23 bisects the upper area of the pixel electrode 12 into two sub-areas, one sub-area having as its one side the second long side of the pixel electrode 12 and the other sub-area having as its one side the first long side of the pixel electrode 12. The lower opening 360 of the common electrode 23, and the linear opening 180 of the pixel electrode 12 trisect the lower area of the pixel electrode 12 into upper, middle and lower sub-areas.

With the configuration of this example of the present invention as described above, the lower and upper polarizer films 14 and 24 are arranged such that their polarizing directions are the same as in the immediate previous example. With this structure, effects similar to those obtained in the previous example are realized.

Figure 10A:
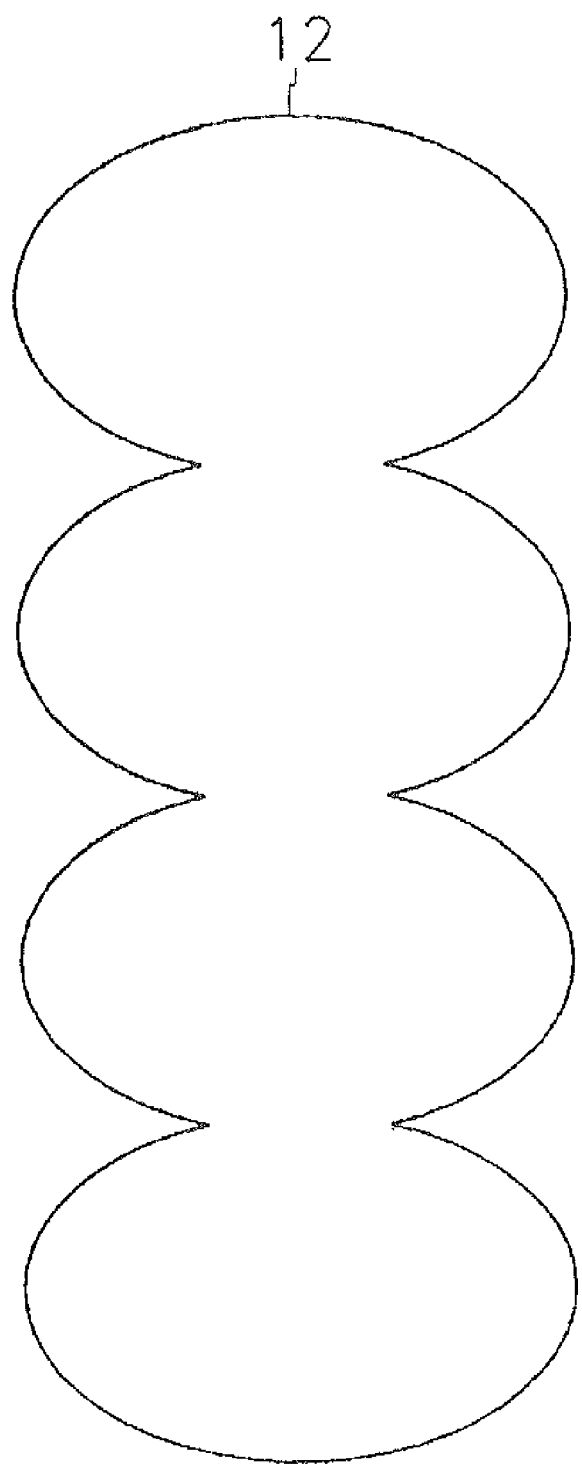
FIG. 10A is a schematic view of an opening pattern of a pixel electrode according to the other example of the present invention.

FIG. 10A shows a schematic view of an opening pattern of the pixel electrode 12 according to the other example of the present invention.

As shown in FIG. 10A, the pixel electrode 12 is formed of four oval-shaped portions sequentially interconnected in the longitudinal direction.

Figure 10B:
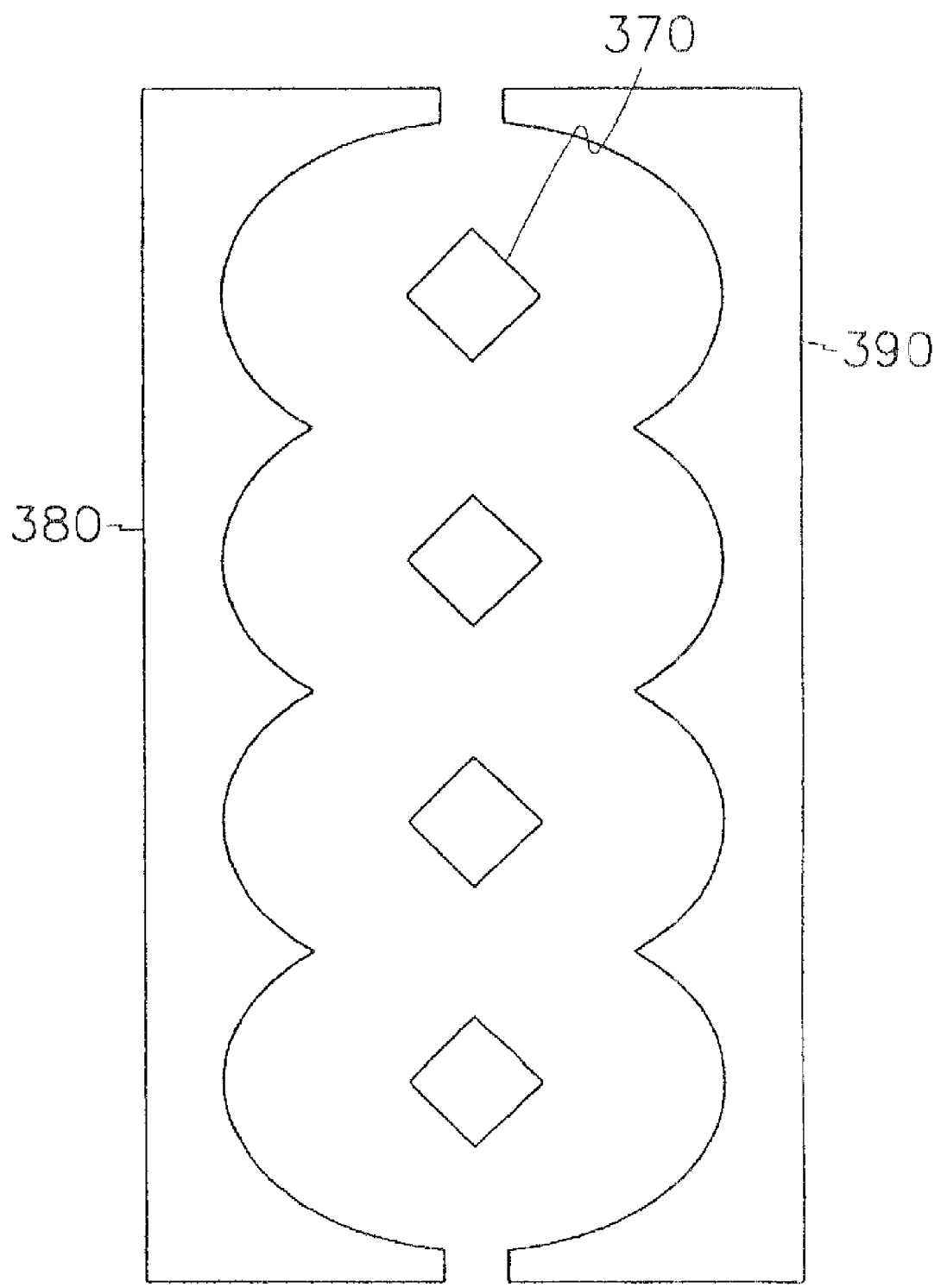
FIG. 10B is a schematic view of an opening pattern of a common electrode according to the other example of the present invention.

FIG. 10B shows a schematic view of an opening pattern of the common electrode 23 according to the other example of the present invention.

As shown in FIG. 10B, the opening pattern of the common electrode 23 includes four diamond-shaped openings 370, and left and right openings 380 and 390 surrounding the diamond-shaped openings 370. The diamond-shaped openings 370 are arranged over a longitudinal center of the common electrode 23 and are spaced apart from each other at a predetermined distance. Inner sides of the left and right openings 380 and 390 facing the diamond-shaped openings 370 substantially form cycloids such that four partial ovals result, each oval surrounding one of the diamond-shaped openings 370.

Figure 10C:
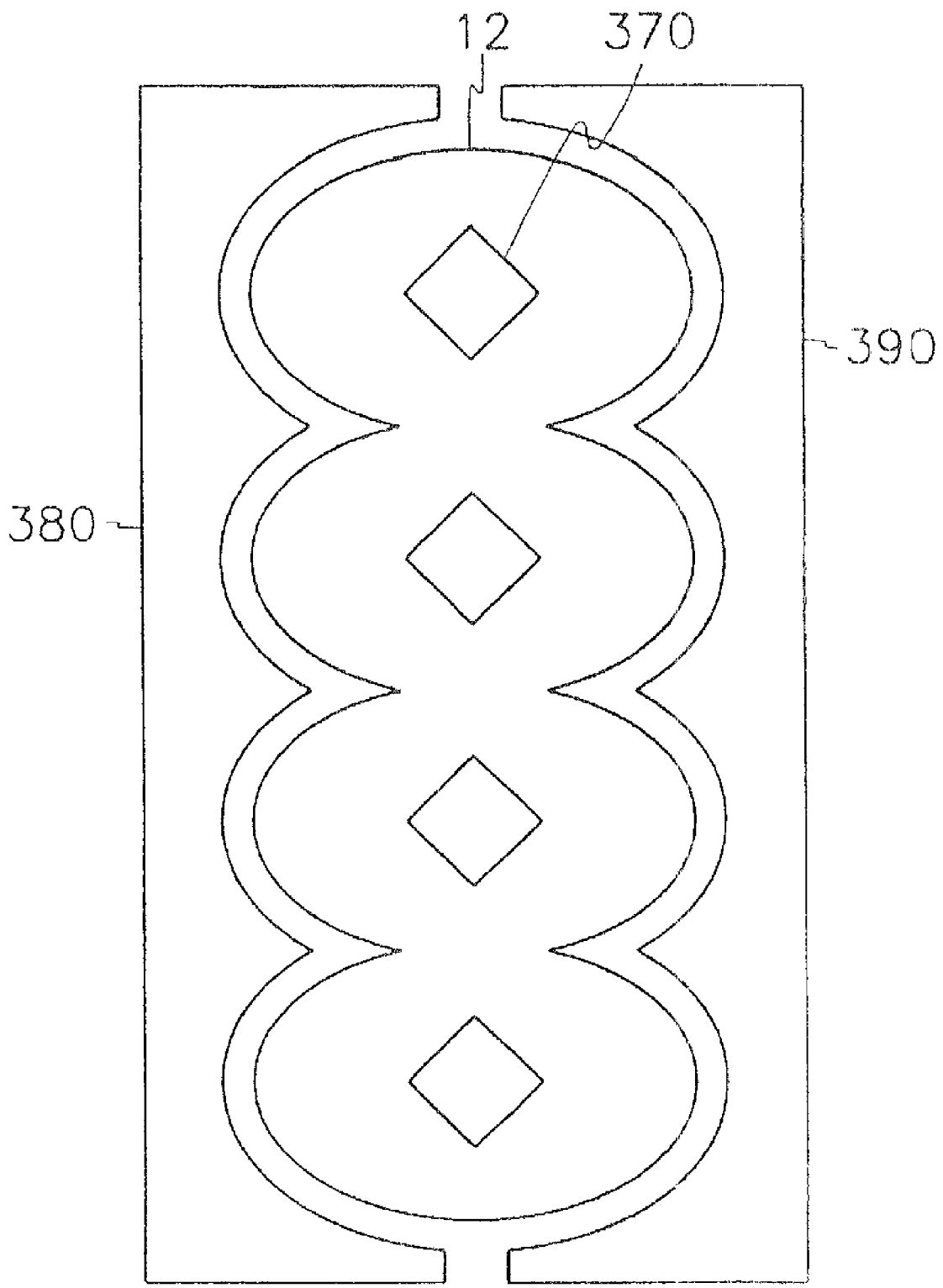
FIG. 10C is a schematic view of the opening patterns of the pixel and common electrodes shown respectively in FIGS. 10A and 10B in an overlapped state.

FIG. 10C shows a schematic view of the pixel electrode 12 and the common electrode 23 shown respectively in FIGS. 10A and 10B in an overlapped state. As shown in FIG. 10C, each diamond-shaped opening 370 of the common electrode 23 is placed at the center of the corresponding oval-shaped portion of the pixel electrode 12. Also, the left and right openings 380 and 390 of the common electrode 23 surround the pixel electrode 12 at a predetermined distance.

With the configuration of this example of the present invention as described above, the lower and upper polarizer films 14 and 24 are arranged such that their polarizing directions are respectively 0° and 90° (or vice versa) with respect to the first and second short sides of the pixel electrode 12. The opening patterns of the pixel and common electrodes 12 and 23 in these example were designed to satisfy the following conditions to the most, the conditions being particular to opening patterns of the type for obtaining the partitioned orientation of the liquid crystal molecules 30.

First, in order to obtain a maximum viewing angle, it is preferable that one pixel area has four partitioned regions for orienting the liquid crystal molecules 30.

Second, to obtain a stable partitioned orientation, disinclination or texture should be eliminated or minimized outside of the partitioned regions. Disinclination occurs when the long axes of liquid crystal molecules are oriented in various directions in a confined area, particularly when the long axes are inclined toward one another. Therefore, it is preferable that the opening patterns of the pixel and common electrodes 12 and 23 are alternately arranged, and the end portions of the opening patterns are adjacent to each other. That is, when viewed from above, the opening patterns of the pixel and common electrodes 12 and 23 are preferably structured in the form of closed polygons. Furthermore, since disinclination is prone to occur when the opening patterns are structured having acute angles, it is preferable that the opening patterns are formed to have only obtuse angles. A stable partitioned orientation of liquid crystal molecules also enhances brightness. At areas where the orientation of the liquid crystal molecules 30 is dispersed, lights tend to leak at an off state, and dark portions are generated at an on state. Also, this dispersion of the orientation of liquid crystal molecules generates afterimages when the liquid crystal molecules are rearranged.

Third, in order to obtain a high level of brightness, the following conditions should be satisfied. The angle made by the two directors of the liquid crystal molecules 30 at adjacent partitioned regions is preferably about 90°. The directors arranged at this angle minimizes the disinclination. The best brightness can be obtained when the angle between the light transmission axis of the polarizer film and the director for liquid crystal molecules is 45°. It is preferable that twisting or bending of the opening patterns of the pixel and common electrodes 12 and 23 is minimized.

Finally, in order to obtain a rapid response speed of the liquid crystal molecules 30, it is preferable again that the opening patterns of the pixel and common electrodes 12 and 23 are neither twisted nor bent too much. That is, it is preferable that the opening patterns of the pixel and common electrodes 12 and 23 linearly face each other.

The effect of an opening width of the opening patterns and a spacing interval between the openings on light transmission and response speed will now be described.

In order to investigate such an interrelation, nine panels, each with different opening patterns were made and tested.

Figure 11:
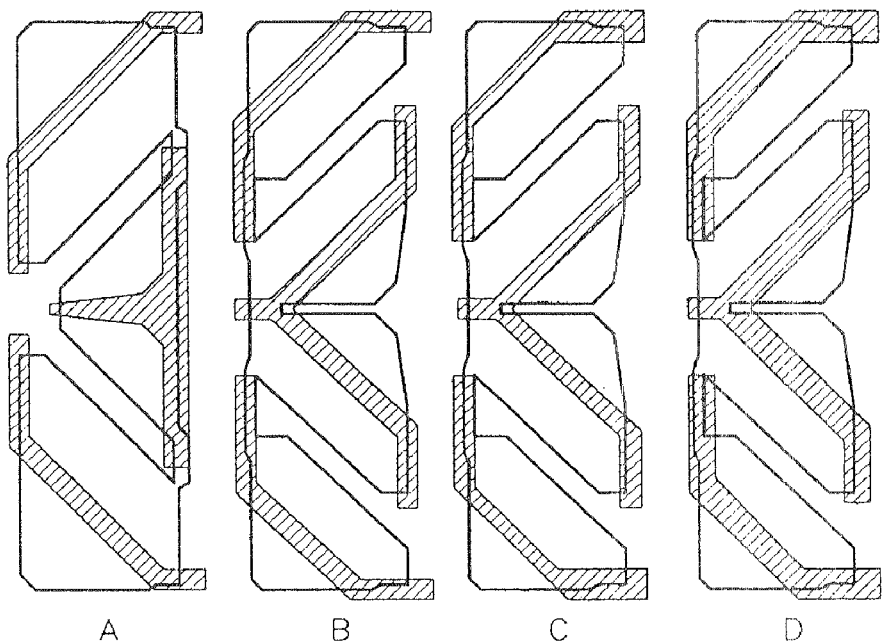
FIG. 11 are schematic views of various types of opening patterns for demonstrating the affect of opening pattern width and spacing on response speed and brightness.
Figure 11:
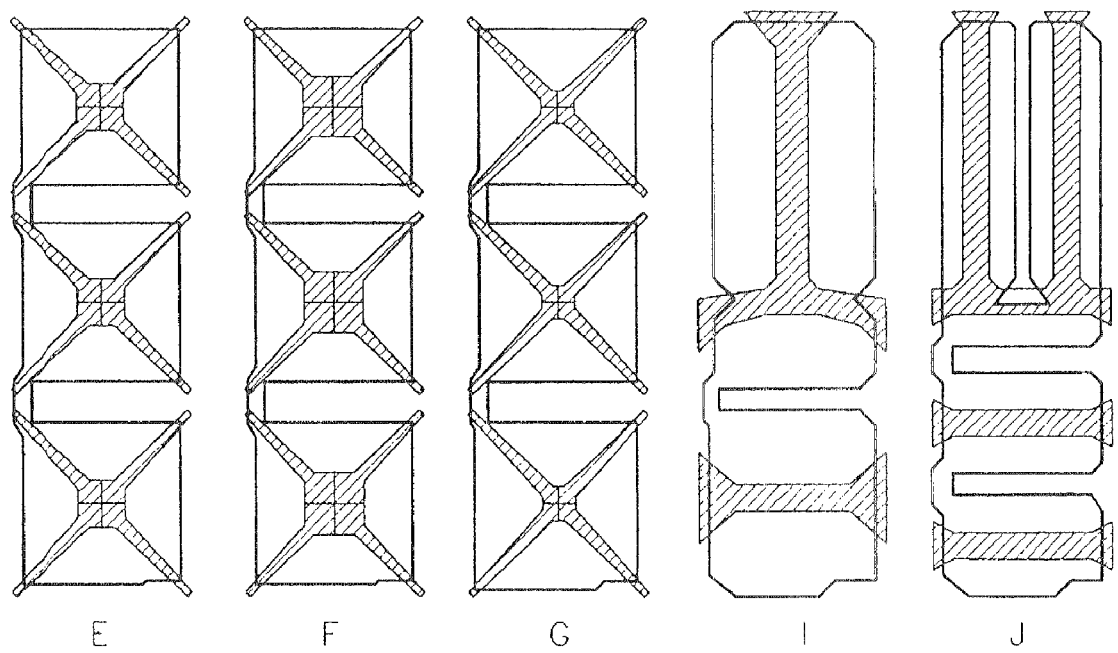

FIG. 11 shows schematic views of nine different opening patterns A-J for demonstrating the effect of opening pattern width and spacing on response speed and brightness. In the drawing, the opening patterns of the common electrode are indicated by hatched lines, and the opening patterns of the pixel electrode are indicated by solid lines.

As shown in FIG. 11, the B, C and D opening patterns are identical and the E, F and G opening patterns are identical. However, these opening patterns differ in opening width and spacing. The I and J opening patterns differ in the number of openings used, effectively having different opening spacings. The A opening pattern has a shape similar to that of the B, C and D opening patterns except for the formation at a center area of the A opening pattern. As a result, the A opening pattern is different in opening spacing from the B, C and D opening patterns. The opening width and the opening spacing of each opening pattern are listed in Table 1.

TABLE 1

| | Opening Width (μm) | Opening Spacing (μm) |
|---|---|---|
| A | 10 | 33.5 |
| B | 10 | 22.5 |
| C | 7 | 25.5 |
| D | 13 | 19.6 |
| E | | 24 |
| F | | 21 |
| G | | 27 |
| I | 10 | Narrow Spacing: 29 |
| | | Wide Spacing: 32 |
| J | 10 | Narrow Spacing: 10 |
| | | Wide Spacing: 16 |

Figure 12A:
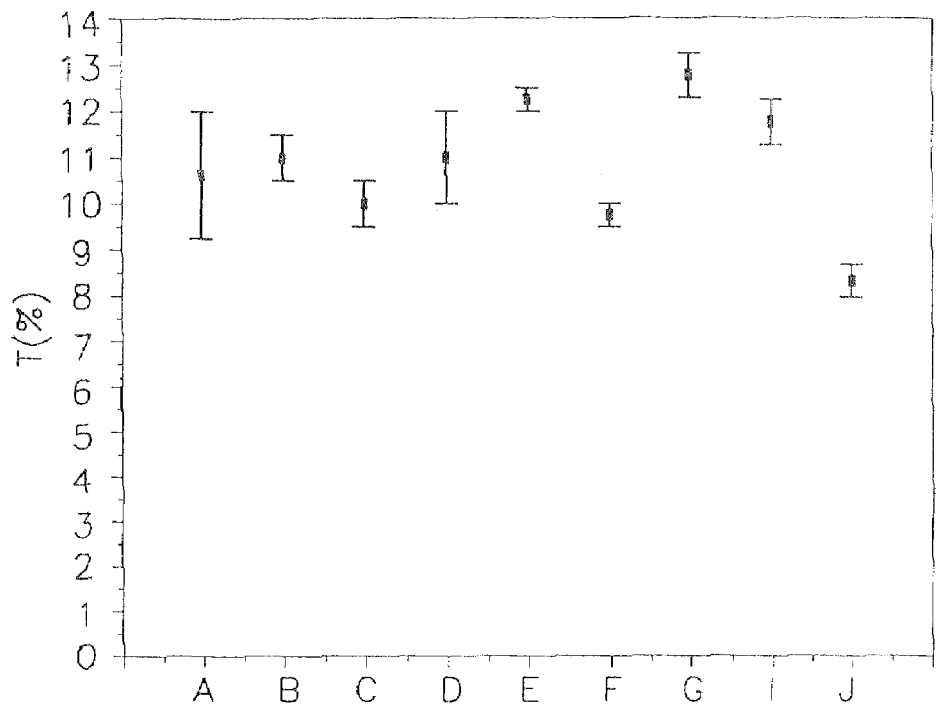
FIG. 12A is a graph illustrating light transmissivity levels of test cells applying the opening patterns shown in FIG. 11.
Figure 12B:
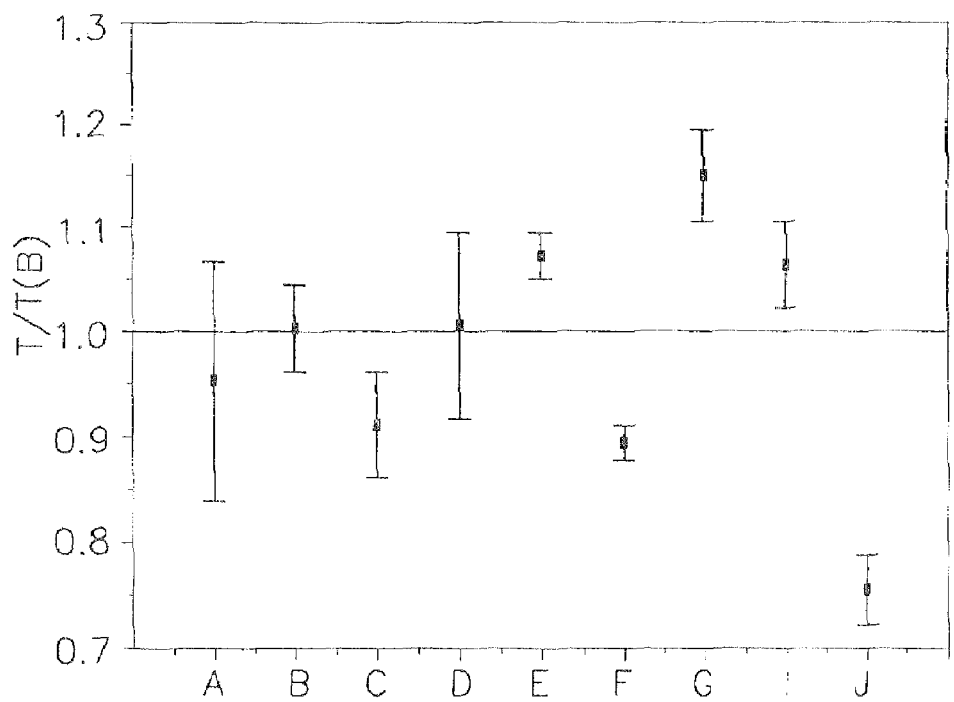
FIG. 12B is a graph comparing the light transmissivity level of a test cell applying a specific opening pattern shown in FIG. 11 to the light transmissivity levels of test cells applying the other opening patterns shown in FIG. 11.

FIG. 12A is a graph illustrating light transmissivity levels of test cells applying the A through J opening patterns, and FIG. 12B is a graph comparing the light transmissivity level of a test cell applying the B opening pattern to the light transmissivity levels of test cells applying the A through J opening patterns. As shown in the graphs, the light transmissivity level of the test cell applying the G opening pattern is the highest, exceeding 13%. The ranking of the light transmissivity levels of the test cells from highest to lowest according to which opening pattern is used is G, E, I, B, D, A, C, F, and J in order.

Figure 13:
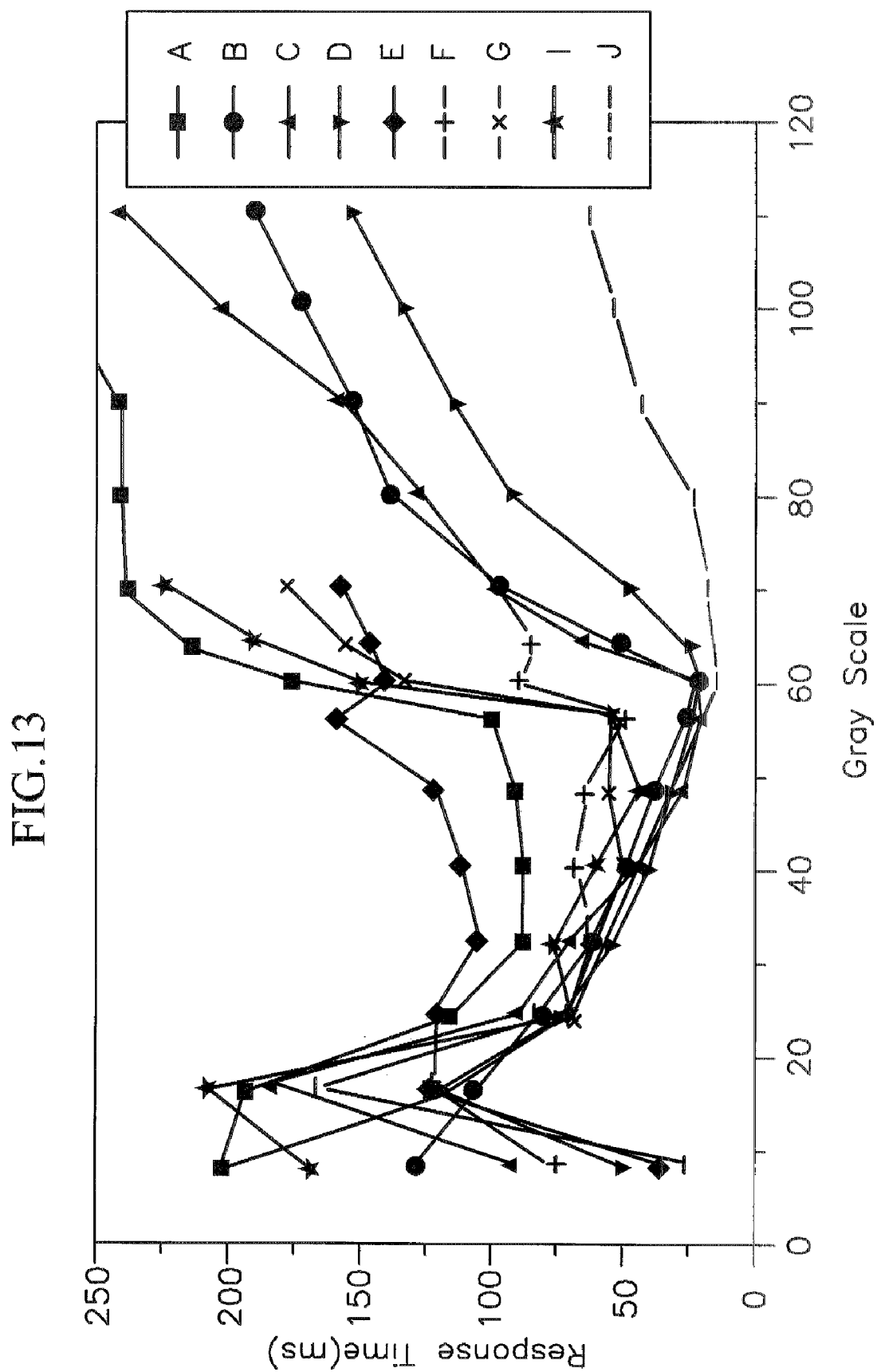
FIG. 13 is a graph illustrating response times as a function of gray scale of test cells applying the opening patterns shown in FIG. 11.

FIG. 13 is a graph illustrating response times as a function of gray scale of test cells applying the A through J opening patterns. Although only sixty-nine (69) gray scales are used in an actual application, the experiment was performed with one hundred and ten (110) gray scales. As shown in the graph, response times of the test cells applying the B, C, D, and J opening patterns were relatively fast over the whole range of gray scales. For the test cells applying the other opening patterns, the response times were relatively slow. In the case of the test cells applying the A and I opening patterns, the slow response times were due to the movement of texture. In the case of the test cells applying the E, F, and G opening patterns, the slow response times can be attributed to the two-step movement of liquid crystal molecules.

The A through J opening patterns shown in FIG. 11 were applied to actual panels and the panels were tested. Testing was performed on a total of four panels for each opening pattern. The results are listed in Table 2.

TABLE 2

| PTN | T (%) | Ton (ms) | Toff (ms) | Ttotal (ms) | White after-image | T (%) | Ton (ms) | Toff (ms) | Ttotal (ms) | White after-image |
|---|---|---|---|---|---|---|---|---|---|---|
| A | 5.50 | 21.53 | 20.38 | 41.73 | Medium | 5.12 | 18.56 | 13.99 | 32.55 | Weak |
|   | 5.44 | 19.14 | 20.18 | 39.32 | Strong | 4.27 | 14.69 | 15.15 | 29.84 | Weak |
| B | 5.23 | 18.16 | 20.28 | 38.44 | very weak | 4.79 | 12.36 | 14.5 | 26.86 | X |
|   | 4.88 | 18.79 | 20.42 | 39.21 | very weak | 4.56 | 12.64 | 15.48 | 28.12 | X |
| C | 4.96 | 18.8 | 21.6 | 40.4 | Strong | 4.07 | 9.6 | 14.8 | 24.4 | Strong |
|   |      |      |      |      |        | 4.19 | 8.98 | 14.3 | 23.28 | Strong |
| D | 4.88 | 24.36 | 21.2 | 40.0 | X | 4.75 | 12.8 | 14.8 | 27.6 | X |
|   |      |       |      |      |   | 4.79 | 13.36 | 13.47 | 26.83 | X |
| E | 5.52 | 22.2 | 21.69 | 46.05 | very weak | 5.34 | 44.11 | 14.28 | 58.39 | X |
|   | 5.58 | 23.67 | 20.0 | 42.2 | very weak |      |       |       |       |   |
| F | 4.79 | 20.8 | 21.63 | 45.2 | X | 4.34 | 70.79 | 14.89 | 85.68 | X |
|   | 5.58 | 20.8 | 19.2 | 40.0 | X |      |       |       |       |   |
| I | 5.51 | 15.0 | 21.6 | 42.4 | Weak | 4.99 | 10.4 | 13.0 | 23.4 | very weak |
|   |      |      |      |      |      | 4.77 | 12.6 | 15.4 | 28 | X |
| J | 4.76 |      | 20.8 | 35.8 | Weak | 4.49 | 7.6 | 12.4 | 20.0 | Weak |
|   |      |      |      |      |      | 3.96 | 9.6 | 15.4 | 25.0 | Weak |

The results of the experiment performed with the actual panels were similar to the results when using the test cells. However, there were some differences as follows. First, the actual panel of the I opening pattern exhibited a higher response speed than the test cell of the same opening pattern. Also, better results with regard to brightness were obtained with the actual panel of the J opening pattern than when the test cell was used. Specifically, the brightness of the test cell applying the J opening pattern was 75% of the cell applying the B opening pattern, whereas this was increased to 90% when the J opening pattern was applied to the actual panel.

When the actual panels were used, white after-images were generated with the application of the C, I, and J opening patterns. The white after-image appeared too much with the application of the C opening pattern that picture quality was impaired beyond the tolerance. However, the generation of white after-images was low enough when the I and S opening patterns were applied so that with some improvement, the panels could be used.

On the basis of the above results, the opening patterns are to be selected depending on what the intended area of improvement is. If the improvement of brightness and the minimization of white afterimages are desired, it is preferable to use the B, D, E, and I opening patterns. However, if an improvement in response speed while keeping the brightness at a normal level is desired, the B, D, and I opening patterns are preferred. Finally, if what is needed is solely an improvement in response speed (without concerning brightness), the D and J opening patterns are preferred.

In order to further examine the interrelation between the response speed and the opening width of the opening patterns, the differences in the optical characteristics of panels applying the B, C, and D opening patterns, which have the same shape but different opening widths, will now be described. FIG. 14 is a graph illustrating response times as a function of gray scale of actual panels applying the B, C, and D opening patterns. As shown in the graph, the response times of the panels applying the opening patterns exhibited the following relation (based on the type of opening pattern) when 20 to 40 gray scales were used: D<B<C. It is evident, therefore, that the larger the width of the opening pattern the faster the response time.

Roughly between 40 and 45 gray scales, the response time of the panel applying the C opening pattern is shorter than that of the panel applying F opening pattern, and after 45 gray scales, the response time of the panel applying the C opening pattern is shorter than that of the panel applying the D opening pattern. However, such a change in the response time of the panel applying the C opening pattern is not actually taking place, but instead is given the appearance of change as a result of the generation of white after-images. That is, the response waveform is distorted due to the white after-images so that the response time seems to be shorter than it actually is. Accordingly, the conclusion originally reached that the larger the width of the opening pattern the faster the response speed remains valid.

With the use 60 gray scales or more, the response speed slows considerably due to the occurrence of texture. In conclusion, the panel applying the D opening pattern, which has the greatest width, exhibits the most stable characteristics. FIGS. 15A to 15C are photographs of the C, B and D opening patterns, respectively, at white gray scales. As seen from the photographs, the C opening pattern with poor texture stability displays the lowest level of brightness, with the B and D opening patterns exhibiting similarly higher levels of brightness. The D opening pattern exhibits a low opening ratio due to its significant width, but displays good texture stability such that panels applying this opening pattern have a high brightness. Texture stability is determined by the intensity of the fringe field and the width of the opening pattern.

The boundary areas between adjacent partitioned regions in the C, B and D opening patterns are formed differently. That is, two clearly distinguishable textures are present in most of the boundary areas of the C opening pattern, and with the B opening pattern, the boundary areas are again distinguishable but not as clearly as with the C opening pattern. The boundary areas of the D opening pattern, on the other hand, are not clearly formed and are faint in many portions.

Figure 16A:
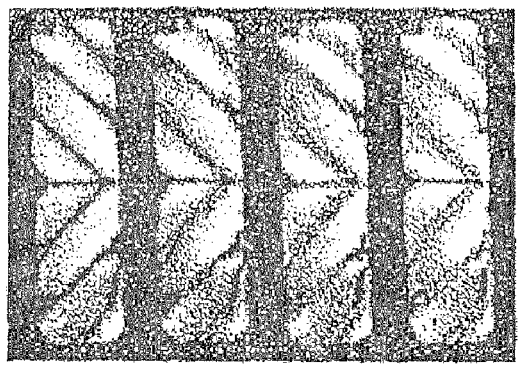
FIGS. 16A and 16B are photographs of specific opening patterns shown in FIG. 11 used to illustrate a change in partitioned regions according to a level of an applied voltage.
Figure 16B:
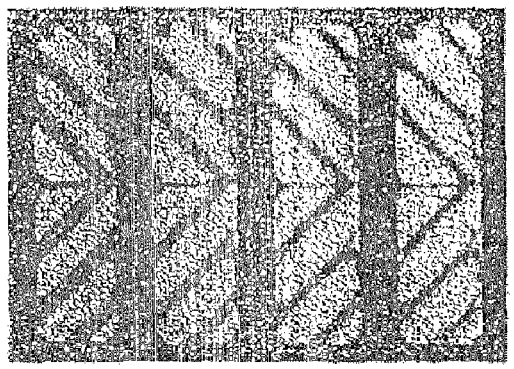

FIGS. 16A and 16B are photographs of the C and D opening patterns applied to test cells in which a change in the partitioned regions according to a level of an applied voltage is shown.

In the C opening pattern, two clearly distinguishable textures are present in the boundary areas when the applied voltage reaches 3.5V, and becomes clearer with further increases in the applied voltage. However, in the D opening pattern, the boundary areas are somewhat clearly distinguishable only when the applied voltage reaches 5V. Such distinguishable boundary areas are a result of the non-uniform orientation of the liquid crystal molecules. To better describe such a phenomenon, the intensity of the fringe field as a function of the widths of the opening patterns will be examined.

Figure 17A:
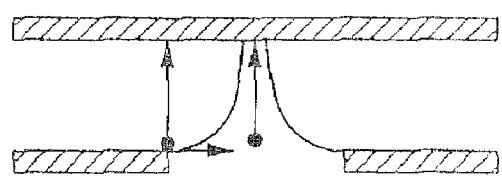
FIGS. 17A and 17B are schematic views used to illustrate the change in intensity of a fringe field according to variations in opening pattern width.
Figure 17B:
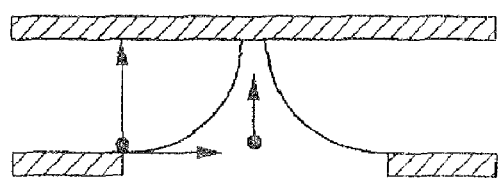
Figure 18A:
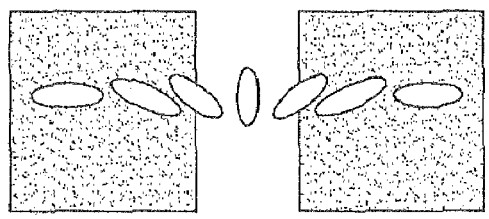
FIGS. 18A to 18D are schematic views illustrating orientation states of liquid crystal molecules at a peripheral portion of opening patterns.
Figure 18B:
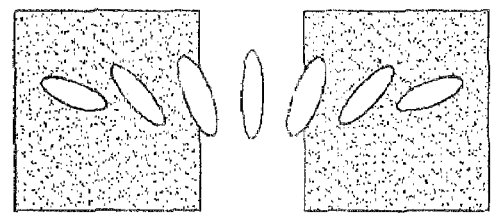
Figure 18C:
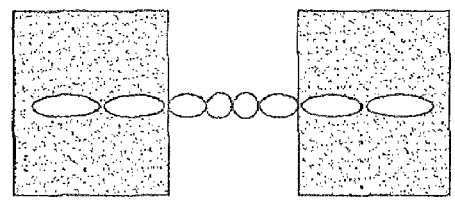
Figure 18D:
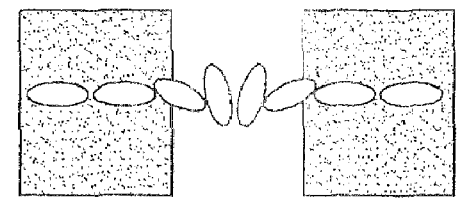

FIGS. 17A and 17B are schematic views used to illustrate the changes in the intensity of a fringe field according to variations in opening pattern width. As the width of the opening pattern becomes larger, the horizontal component of the fringe field experiences corresponding increases. The horizontal component of the fringe field plays an important role in determining the orienting direction of liquid crystal molecules. Therefore, opening patterns with a large width are preferred in forming partitioned regions. In contrast, the larger the width of the opening pattern the weaker the intensity of the vertical component of the electric field working at the center of the opening pattern.

FIGS. 18A to 18D are schematic views illustrating orienting states of liquid crystal molecules at a peripheral portion of the opening patterns. When the width of the opening pattern is relatively small, the liquid crystal molecules are horizontally oriented to some degree even at the center area of the opening pattern. That is, they are slightly inclined when the applied voltage is low, but completely oriented in the horizontal direction when the applied voltage is high. This is due to the vertical component of the electric field being strong even at the center area of the opening pattern. As a result, the light tends to leak and the boundary area between the partitioned regions is formed by two separate lines. Furthermore, when the orienting direction of the liquid crystal molecules is changed by 180°, elasticity becomes greater due to the small width of the opening pattern. In contrast, as the horizontal component of the fringe field is weak, the fringe field is not strong enough to overcome the elasticity, thereby resulting in the orienting direction of the liquid crystal molecules at the boundary areas becoming non-uniform between the partitioned regions. Such a non-uniform orientation of the liquid crystal molecules occurs even in micro regions of the pixel.

When the width of the opening pattern is relatively large, the long axes of the liquid crystal molecules are perpendicular to the electrodes at the center area of the opening pattern. As the applied voltage is increased, the liquid crystal molecules are slightly inclined, but the degree of inclination is less than when the opening pattern has a small width. Therefore, only a minimal amount of light leaks and the boundary area between adjacent partitioned regions is shaped with a dark line.

As described previously, the greater the width of the opening pattern the more rapid the response speed, and as stated above, a greater width of the opening pattern leads to more uniform micro regions of the pixel. When the width of the opening pattern is great, although the opening ratio is low, the orientation of the liquid crystal molecules is uniform enough to obtain a satisfactory degree of brightness. According to the above experimental results, it is preferable that the opening width of the opening pattern is in the range of 13±3 μm, and the cell gap is in the range of about 4-6 μm.

The effect of opening spacing on the optical characteristics of the opening patterns will now be described.

The I and J opening patterns have the same total widths but effectively different spacings. According to the experimental results with respect to the test cells, the optical characteristics of the I and J opening patterns are significantly different. However, when actual panels apply these opening patterns, the resulting optical characteristics of the I and J opening patterns do not vary by such a degree. It is viewed that this is a result of the such factors as the difference in the type of alignment layer used, whether a protective insulating layer is used, the difference in the waveforms of the applied voltage, etc. However, when the speeds of moving picture images are compared in the actual panels, they are more rapid with the J opening pattern than with the I opening pattern, This can be easily demonstrated by observing the motion of a dark rectangle on a gray background. The only difference in response speed occurs by variations in the gray scales.

Regarding the opening width of the opening pattern, when the spacing between the opening portions of the opening pattern becomes smaller, the opening ratio is significantly reduced but the brightness does not change much. This is due to texture. That is, when the distance between the opening portions is increased, it becomes difficult to control the texture, whereas it can be easily controlled when the opening spacing is small. Therefore, when the distance between the opening portions is small, the opening ratio is reduced but it becomes easy to control the texture which compensates the brightness. The exception is the I opening pattern, in which even though the distance between the opening portions is large, a high brightness can be achieved because texture is easily controlled.

In brief, a smaller distance between the opening portion results in an improvement of the response speed at various gray scales. Even though the brightness is negatively affected due to the decreasing opening ratio, this can be compensated for to some degree by controlling texture.

There exists a direct correlation between texture and response speed. Moving texture reduces response speed. When a high voltage is applied, the response speed is reduced in most of the opening patterns. This is due to the generation of texture. Therefore, if texture can be properly controlled, picture quality as well as response speed can be improved. Techniques of preventing texture will now be described.

Figure 19:
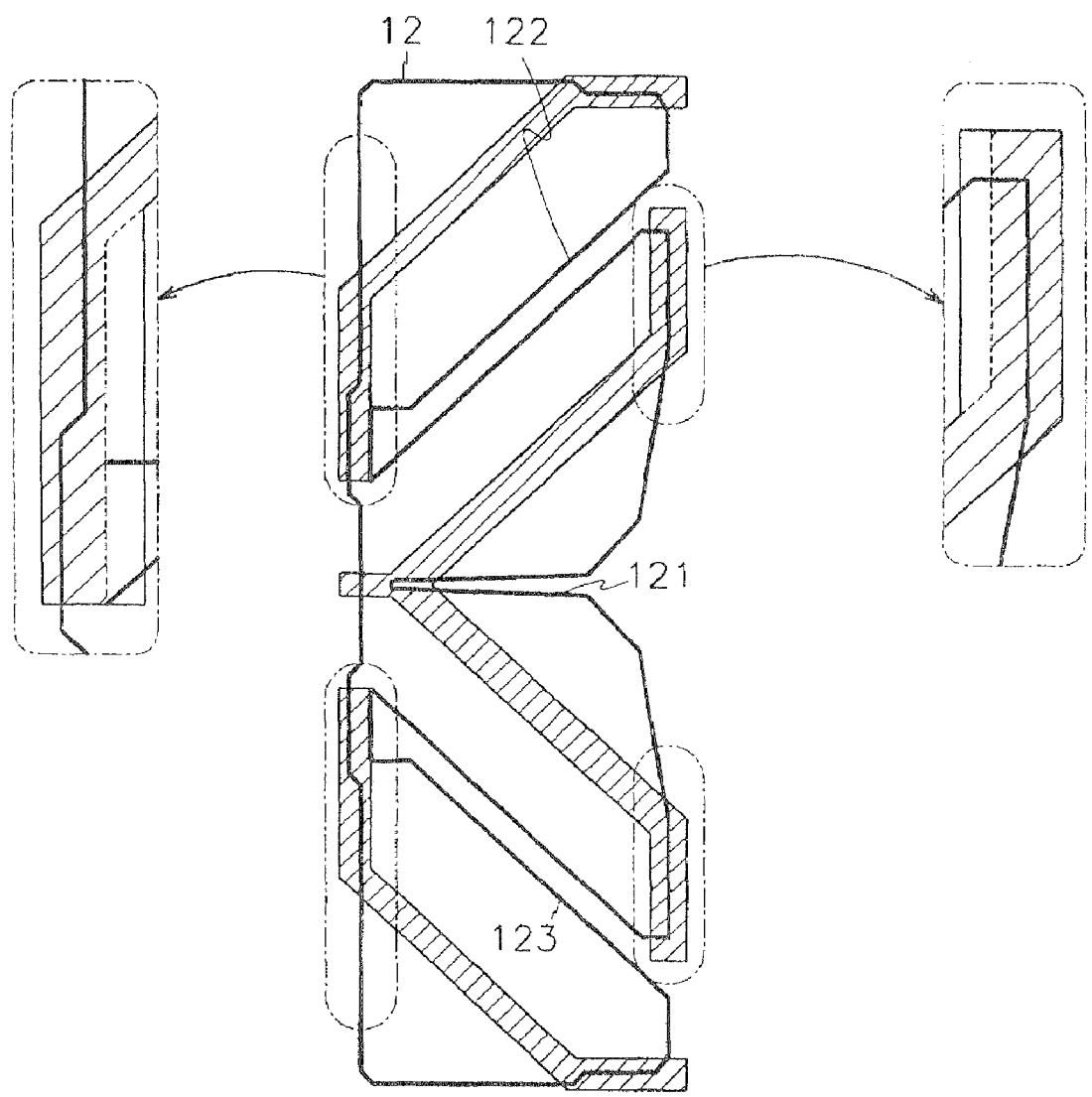
FIGS. 19 and 20 are schematic views of areas where texture occurs in specific opening patterns shown in FIG. 11.
Figure 20:
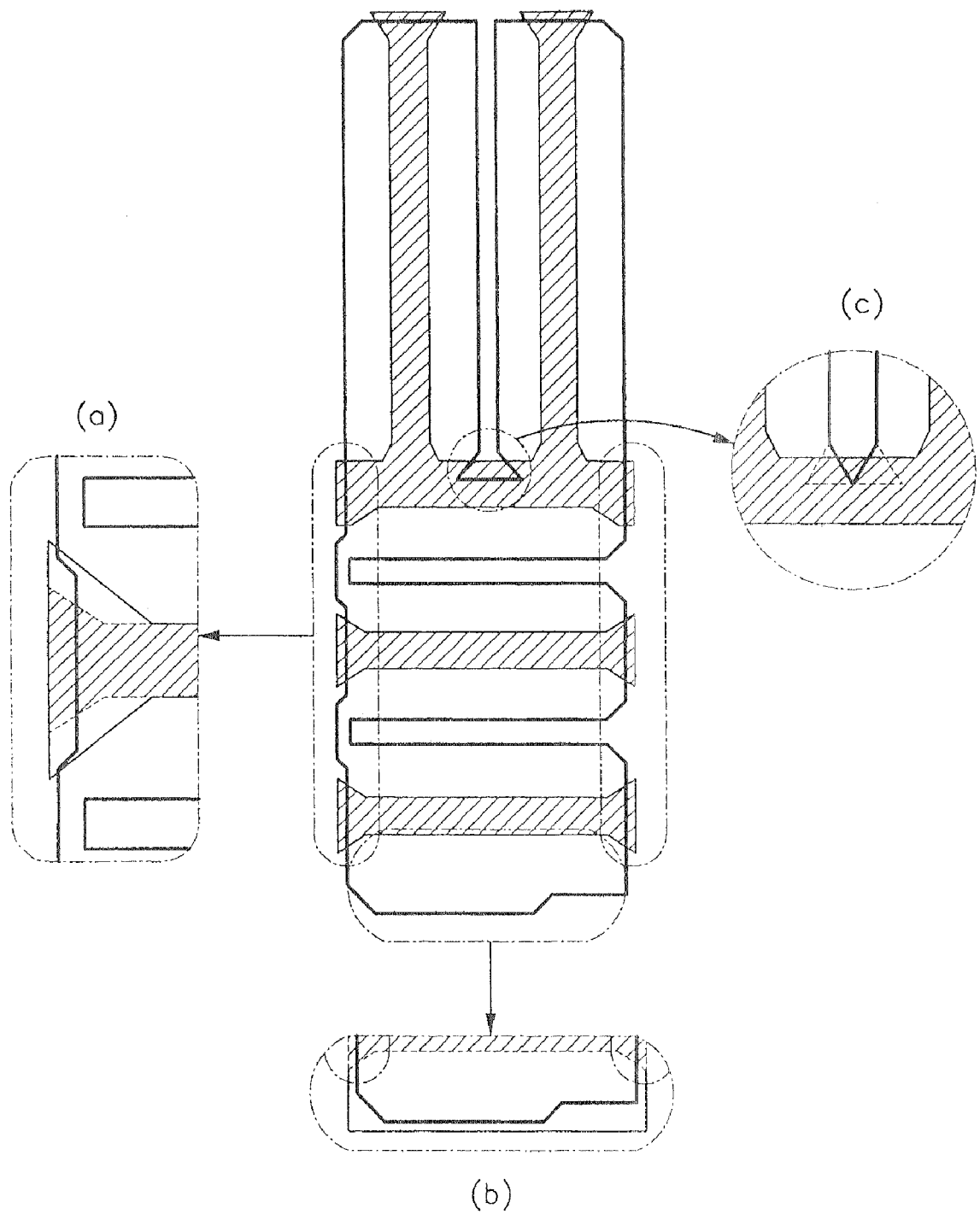

FIGS. 19 and 20 show schematic views of portions where texture is generated in the B and J opening patterns, respectively. The opening pattern shown in FIG. 19 is nearly identical to that shown in FIG. 4C. However, in the opening pattern of FIG. 19, second and third openings 122 and 123 of the pixel electrode 12 begin from the first long side of the pixel electrode 12 and extend toward the second long side of the pixel electrode 12 nearly reaching the same, whereas in the opening pattern of FIG. 4C, the second and third openings 122 and 123 are structured in the opposite manner. Furthermore, portions of the second long side of the pixel electrode 12 adjacent to ends of the second and third openings 122 and 123 of the opening pattern of FIG. 19 are protruded externally to prevent the interconnection of the partitioned regions of the pixel electrode 12 from deteriorating due to the opening portions 122 and 123.

Portions where texture occurs mainly correspond to areas where ends of the opening portions of the common electrode 23 and ends of the opening portions of the pixel electrode 12 meet. When the upper and lower substrates are appropriately arranged, the occurrence of texture is low, whereas when the substrates are inappropriately arranged, half moon-shaped textures, which do not cause the generation of white after-images, occur. In order to inhibit such texture occurrence, the width of the ends of the opening portions of the common electrode 23 may be enlarged. Through such enlargement, the tolerance of error in arrangement can be increased.

The opening pattern shown in FIG. 20 is similar to that shown in FIG. 8C, but differs in the number of openings extending across the pixel electrode from the first long side to the second long side. Furthermore, the openings of the pixel electrode 12 are such that they are open where they begin at the first long side of the pixel electrode 12 and extend across toward, but not reaching, the second long side of the pixel electrode 12. Portions of the second long side of the pixel electrode 12 adjacent to ends of these openings are protruded externally.

The occurrence of texture is concentrated at areas "a" corresponding to ends of openings of the common electrode 23 proceeding across front the first long side to the second long side of the common electrode 23. Furthermore, texture occurs also along the second short side of the pixel electrode 12, or area "b", which is deformed outwardly to enable a connection with the source electrode, as well as at area "c" at an end of an opening of the pixel electrode 12.

Such texture can be inhibited in the following way. In the case of area a, a width of the ends of the openings of the common electrode 23 are increased. In the case of area b, the openings of the common electrode 23 are structured to overlap part of area b. For this purpose, it is necessary to control the width and spacing of the opening portions. When the spacing is decreased, the opening ratio is reduced but the response speed is enhanced. In the case of area c, the end of the opening of the pixel electrode 12 extended from the first short side is formed having sharp edges.

Figure 21A:
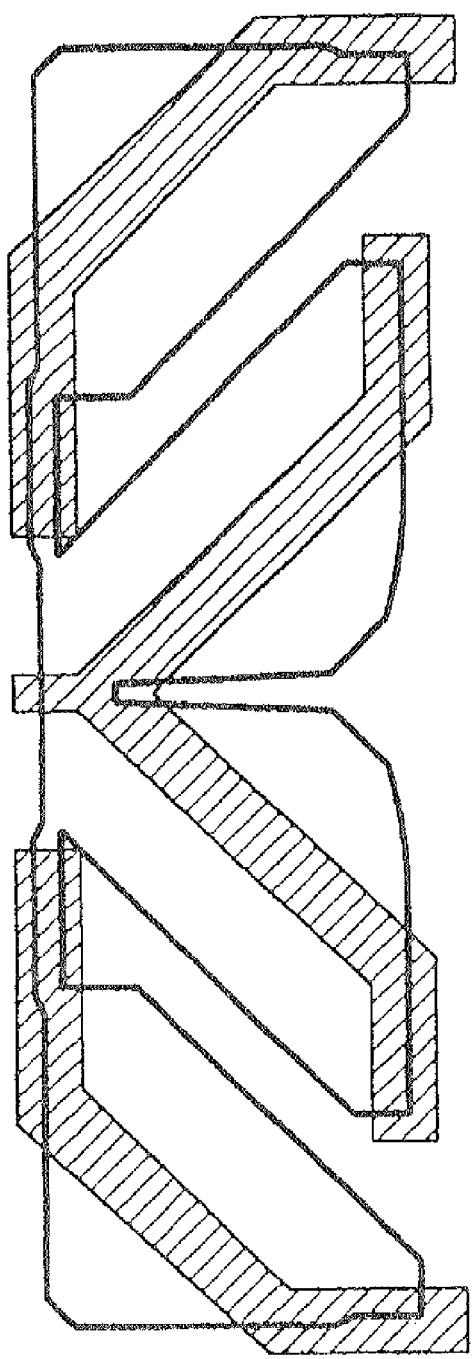
FIGS. 21A to 21C are schematic views of opening patterns where texture eliminating techniques have been applied.
Figure 21B:
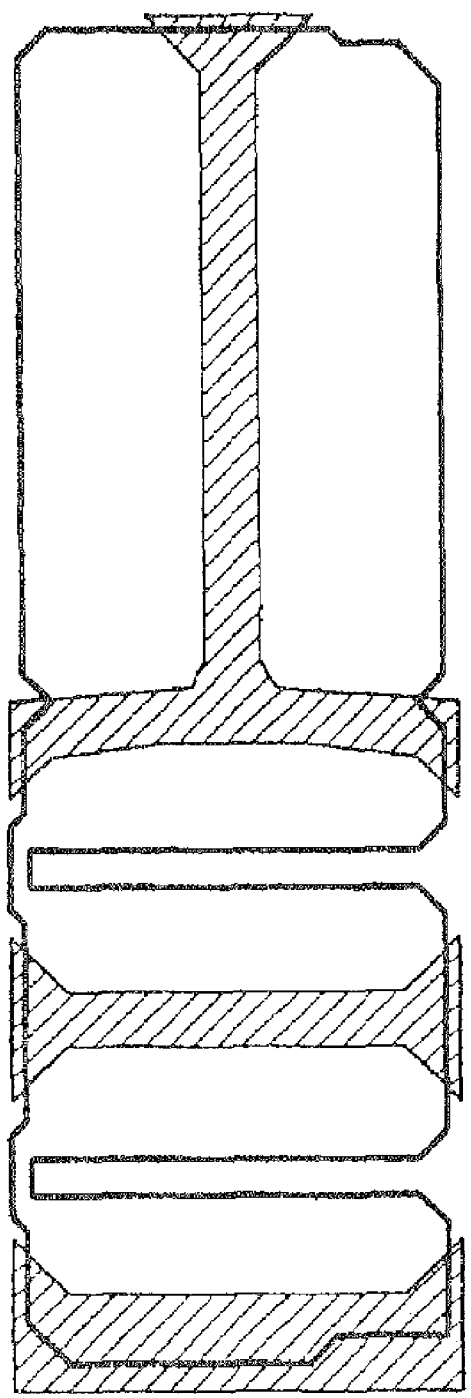
Figure 21C:
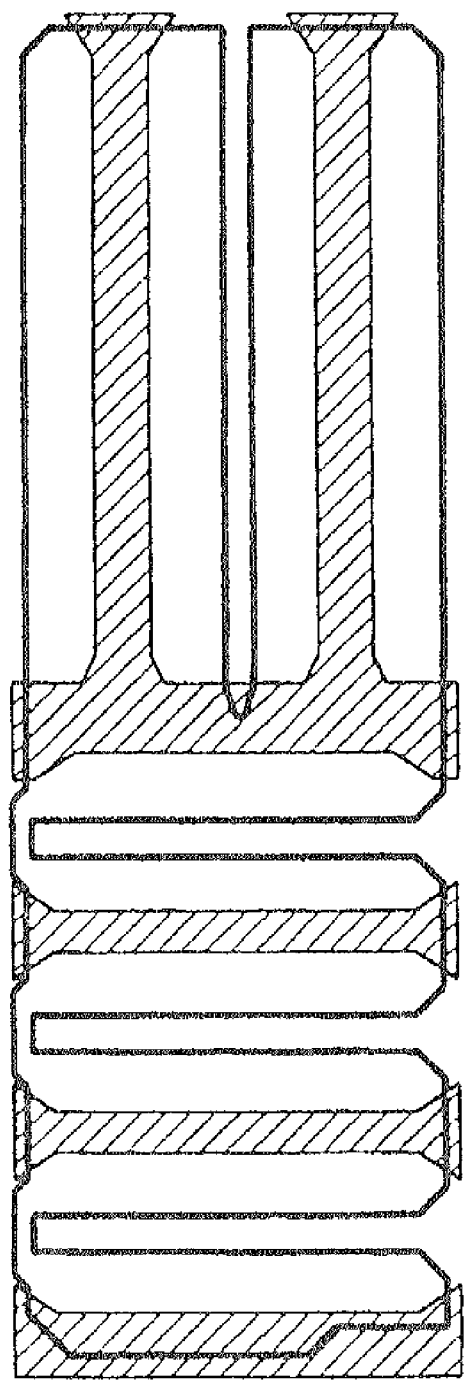

FIGS. 21A to 21C illustrate opening patterns where the above-described texture eliminating techniques have been applied.

In the above description, a structure in which the opening patterns are formed at both the pixel and common electrodes 12 and 23 is disclosed. However, it is also possible to form the opening patterns, together with the protrusions, only at the pixel electrode 12. In this case, the protrusions are formed using a gate insulating layer or a protective layer. In the formation of the protrusions, care should be taken to avoid the formation of parasitic capacitance between electrical lines. The openings and the protrusions can be arranged as illustrated in FIG. 21.

Alternatively, the opening patterns may be formed only in the pixel electrode 12 while forming the protrusions in the common electrode 23. In this case, the openings and the protrusions can be arranged also as illustrated in FIG. 21.

As described above, thee inventive liquid crystal display obtains a wide viewing angle, and exhibits stable orientation of the liquid crystal molecules and a rapid response speed.

Figure 22:
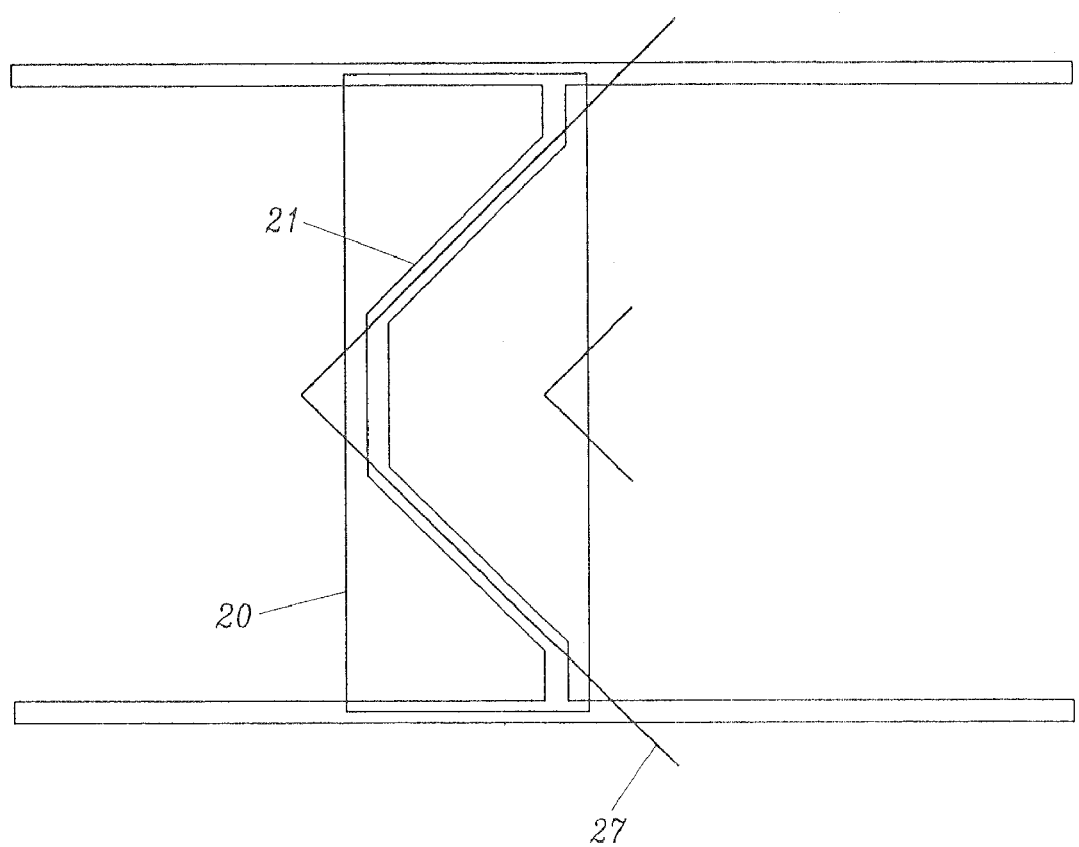
FIG. 22 is a layout view of a TFT substrate according to the other example of the present invention.
Figure 23:
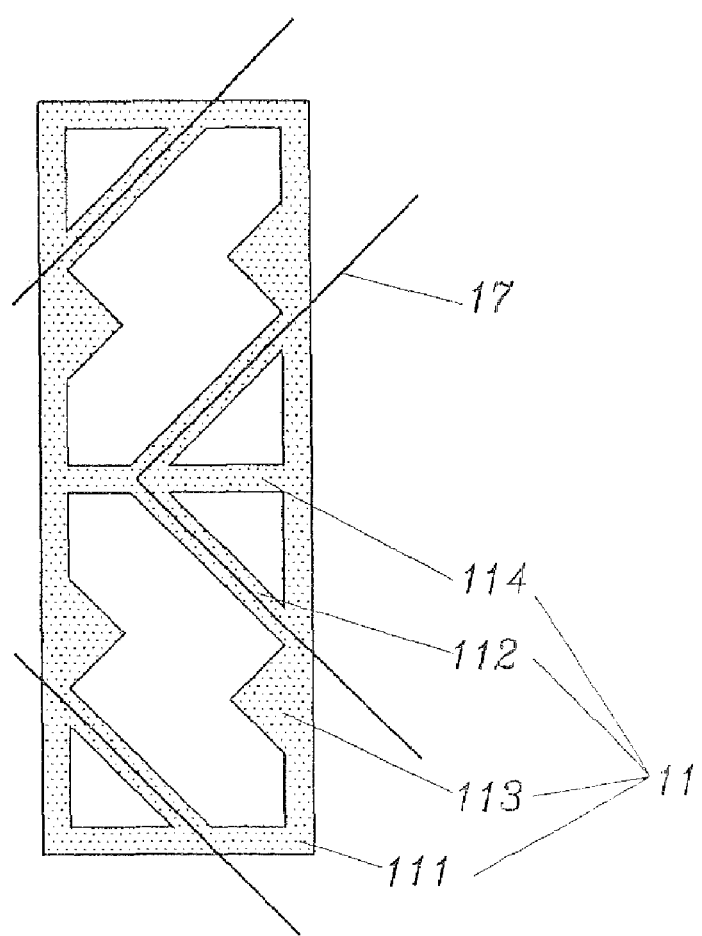
FIG. 23 is a layout view of a color filter substrate opposite the TFT substrate in FIG. 22 according to the other example of the present invention.

FIGS. 22 and 23 are layout views of a TFT substrate and a color filter substrate according to the other examples respectively.

As shown in FIG. 22, a portion 210 of a gate line 21 which transmits a scanning signal is formed to have a trapezoidal shape without the lower side. Then, the portion 210 made of opaque metal blocks the light from the backlight, and, therefore the light leakage or the decrease of luminance can be prevented.

Next, as shown in FIG. 23, a black matrix 11 is formed on the color filter substrate to cover the regions where disclination is generated and the aperture in the common electrode. The disclination regions are, as described above, the region where the aperture 27 on the TFT substrate meets the boundary of the pixel electrode 20 and the region where the saw-shaped apertures 17 and 27 are bent. The black matrix pattern which covers the disclination includes, as shown in FIG. 23, an edge portion 111 surrounding and defining a pixel region, a saw-shaped portion 112 to cover the apertures 17, a triangular portion 113 to cover the disclination between saw-shaped apertures 17 and 27 and a center portion 114 put across the pixel region to cover the disclination generated in the bent portion of the apertures 17 and 27. Then, the light leakage generated by the disclination or the apertures is prevented by the black matrix 11. Moreover, the aperture ratio does not decrease additionally though a relatively large area of black matrix 11 is formed, because the region that the black matrix covers may not be used for display.

Figure 24:
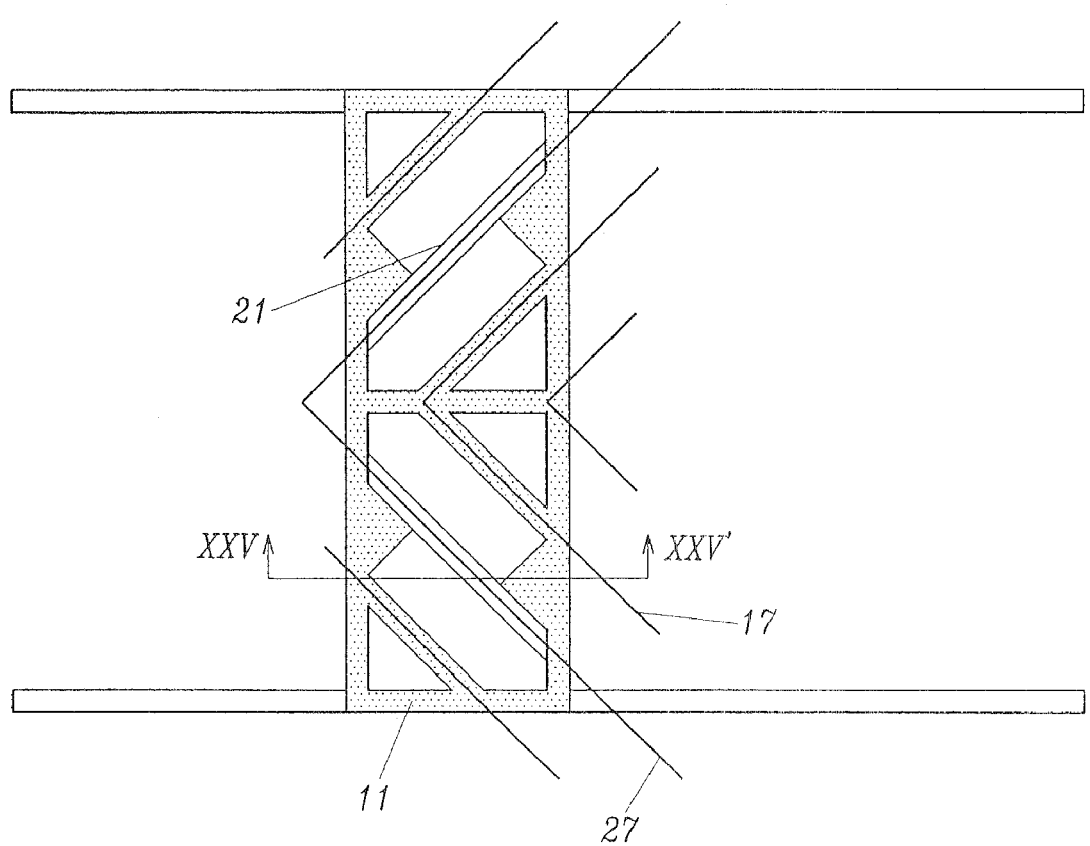
FIG. 24 is a layout view of an LCD having the TFT substrate and the color filter substrate shown in FIGS. 22 and 23 according to the other example of the present invention.
Figure 25:
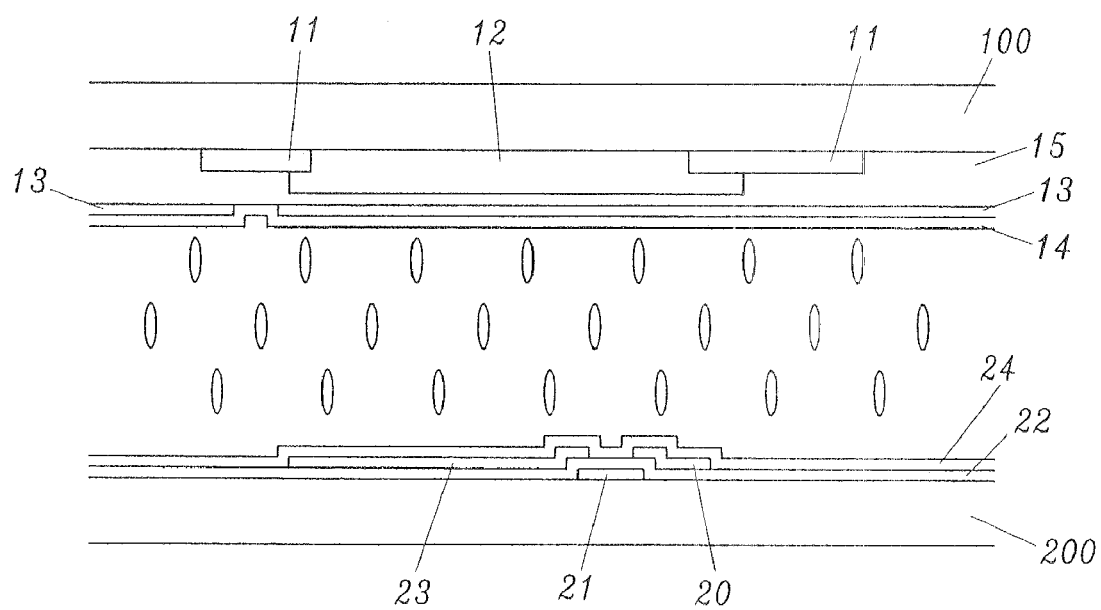
FIG. 25 is a sectional view of the LCD shown in FIG. 24 taken along the line XXV-XXV'.

FIG. 24 is a layout view of an LCD according to the other example of the present invention. FIG. 25 is a sectional view of an LCD shown in FIG. 24 taken along the line XXV-XXV'.

As shown in FIGS. 24 and 25, a portion 210 of a gate line 21 is formed on a lower TFT substrate. The gate line has a trapezoidal shape without the lower side. An insulating layer 22 covers the gate line 21. A pixel electrode 23 is formed on the insulating layer 22, and portions of the pixel electrode 23 are removed to form saw-shaped apertures 27 over the portion 210 of the gate line 21. A vertical alignment layer 24 is formed on the pixel electrode 20.

On the other hand, a black matrix 11 is formed on an upper color filter substrate to shield the outside of the pixel regions, the aperture and the disclination regions. In the pixel region within the black matrix 11 a color filter 12 is formed. A passivation layer 15 is formed on the black matrix 11 and the color filter 12. An ITO common electrode 13 is formed thereon and patterned to remove the portion overlapping the black matrix 11. The aperture 17 formed on the upper substrate is arranged alternately to the aperture 27 formed on the lower substrate, and the apertures 17 and 27 are parallel to each other.

A liquid crystal material layer with negative dielectric anisotropy is interposed between two substrate 100 and 200, and the liquid crystal molecules are homeotropically aligned to the substrate 100 and 200 by the aligning force of the alignment layers 14 and 24.

Figure 26:
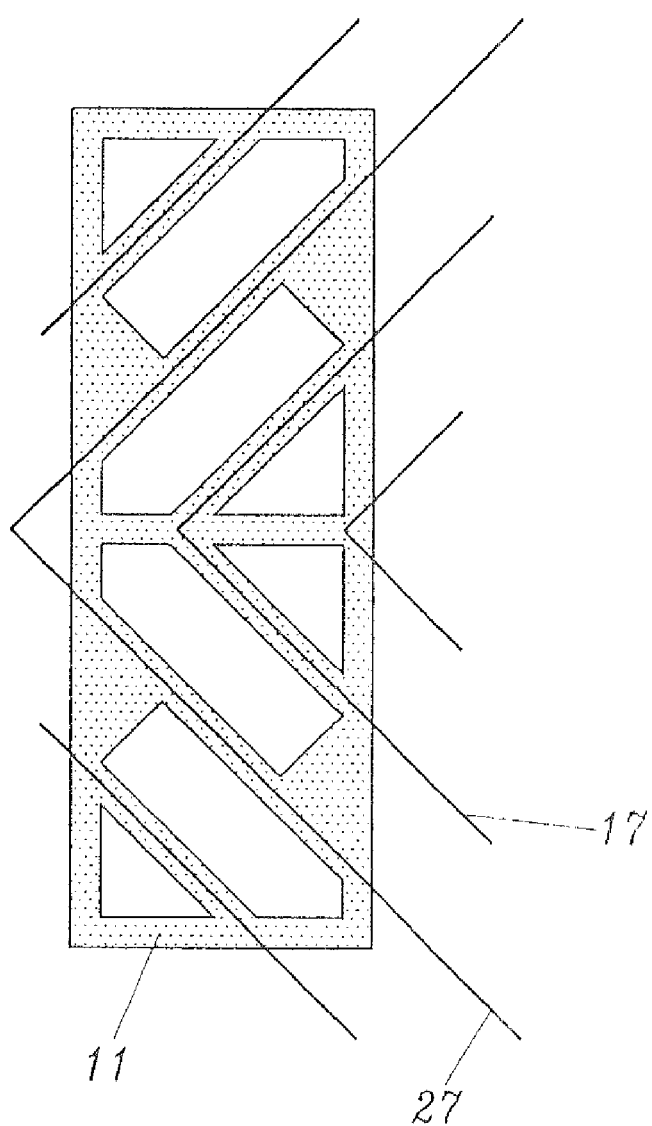
FIG. 26 is a layout view of a color filter substrate according to the other example of the present invention.

It is possible to form a gate line as in a conventional LCD and the apertures formed on the lower substrate is also covered by the black matrix, as shown in FIG. 26 which is a layout view of a color filter substrate according to the other example of the present invention.

A black matrix 11 is formed to define a pixel region and to cover the aperture 17 to form multi-domain, the disclination between saw-shaped apertures 17 and 27 and the disclination generated in the bent portion of the apertures 17 and 27 as in the immediate previous example. In addition, the black matrix 11 includes another portion to cover the aperture 27 formed on the lower substrate.

If the black matrix covers the apertures and the disclination as in this example, it is not necessary to consider the influence by the gate line pattern and no additional process step is required.

Moreover, the shape of the pixel electrode may be changed instead of forming the branch aperture in some of the previous examples.

As shown in the above, the region where the disclination is generated is the region where the aperture on the TFT substrate meets the boundary of the pixel electrode. This region is the place where the first condition that the bent angle of the aperture pattern should be an obtuse angle is not satisfied because the boundary of the pixel electrode is essentially similar to the aperture. In other words, the liquid crystal molecules do not arrange in order and such arrangement causes the decrease of the luminance and after-image.

Figure 27:
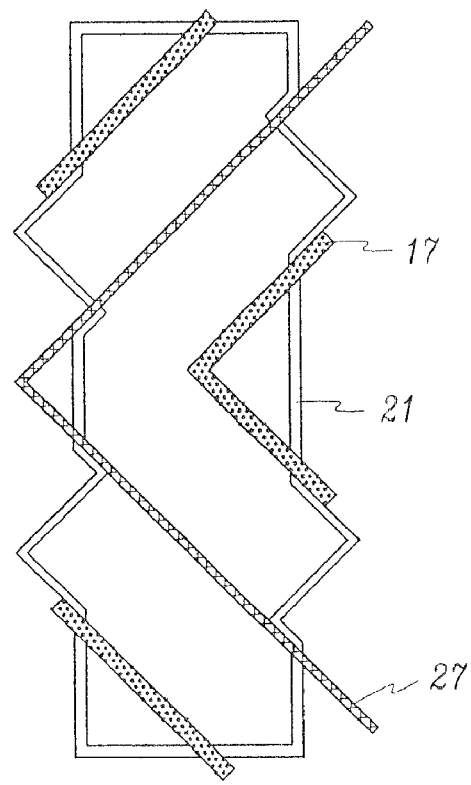
FIGS. 27 and 28 are layout views of LCDs according to the other example of the present invention respectively.

Therefore, in the other example of the present invention, the shape of the pixel electrode 21 is changed to make an angle between the aperture 27 formed in the pixel electrode 21 and the boundary of the pixel electrode 21 to be an obtuse angle. Then, as shown in FIG. 27, the pixel electrode 21 has a saw shape that is convex between the apertures 17 and 27 formed in the common electrode and the pixel electrode respectively.

Figure 28:
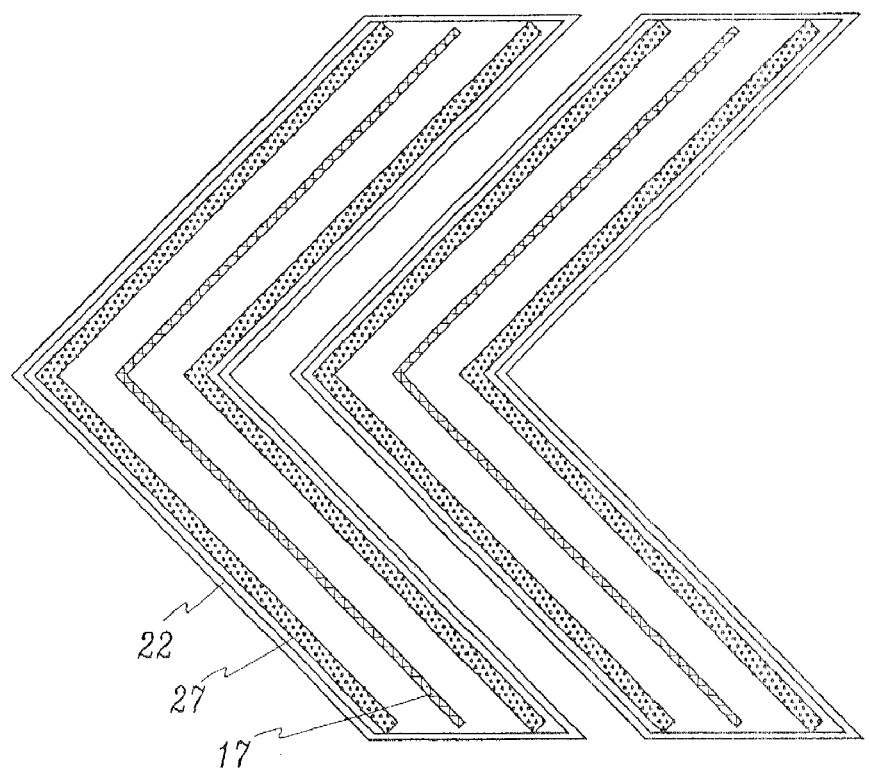

In the other example of the present invention as shown in FIG. 28, the pixel electrode is formed to have a saw shape surrounding the apertures.

Since the pixel electrode 22 is formed to have a saw shape surrounding the apertures 17 and 27, the regions where the apertures 17 and 27 meet the boundary of the pixel electrode are removed thereby removing the disclination.

According to the embodiments of the present invention, multi-domain LCDs are formed using various ITO pattern to control the arrangement of liquid crystal molecules, therefore wide viewing angle is obtained, disclination is removed and the luminance is increased.

In the described embodiments of the present invention, only apertures form the domains. However, the domains may be formed by protrusions along with apertures. In this case, the protrusions may be made of a gate insulating layer and/or a passivation layer. The layout of the protrusions and the aperture pattern may be the same as that of the apertures in FIGS. 21A to 21C. The protrusions may be formed on the color filter substrate.

While the present invention has been described in detail with reference to the preferred embodiments, those skilled in the art will appreciate that various modifications and substitutions call be made thereto without departing from the spirit and scope of the present invention as set forth in the appended claims.

What is claimed is:

1. A liquid crystal display, comprising:
a first substrate on which a first electrode is formed;
a second substrate on which a second electrode is formed; and
liquid crystal positioned between the first and second substrates, wherein:
the first electrode includes first domain defining members and the second electrode includes second domain defining members, and
the second domain defining members includes a trunk portion, first and second branches extending from the trunk portion, and first and second sub-branches respectively extending from ends of the first and second branches, wherein the second domain defining members includes an upper body and a first limb extending from the upper body along a first side of the first electrode substantially parallel to the trunk portion and at an obtuse angle with respect to the upper body.

2. The liquid crystal display of claim 1, wherein the upper body extends from the first side of the first electrode to a second side of the first electrode, wherein the first side is substantially perpendicular to the second side.

3. The liquid crystal display of claim 2, wherein the trunk extends substantially parallel to the first side of the first electrode, and the first and second sub-branches are oblique to the first and second branches and extend along a second side of the first electrode substantially perpendicular to the first side.

4. The liquid crystal display of claim 3, wherein directions in which the first and second branches extend are different from each other.

5. The liquid crystal display of claim 2, wherein the trunk portion, first and second branches, and first and second sub-branches are formed in a pixel area and are separated from domain defining members of an adjacent pixel area.

6. The liquid crystal display of claim 2, wherein the first domain defining members include a trunk portion extending substantially parallel to and overlapping, at least in part, the trunk portion of the second domain defining members.

7. The liquid crystal display of claim 2, wherein the first and second domain defining members include protrusions or opening patterns.

8. The liquid crystal display of claim 7, wherein the first domain defining members include opening patterns and the second domain defining members include protrusions.

9. The liquid crystal display of claim 2, wherein the second domain defining members include a lower body.

10. The liquid crystal display of claim 1, wherein the upper body extends from the first side of the first electrode to a second side of the first electrode, wherein the first side is shorter than the second side.

11. The liquid crystal display of claim 2, wherein the second domain defining members include a second limb extending from the upper body along a second side of the first electrode and oblique to the upper body.

12. The liquid crystal display of claim 11, wherein the second domain defining members include a third limb extending from the lower body along a third side of the first electrode and oblique to the lower body.

13. The liquid crystal display of claim 9, wherein the second domain defining members include a third limb extending from the lower body along a third side of the first electrode and oblique to the lower body.

14. The liquid crystal display of claim 13, wherein the third side is opposite the first side.

15. The liquid crystal display of claim 9, wherein the second domain defining members include a third limb extending from the lower body substantially parallel to the first limb and oblique to the lower body.

16. The liquid crystal display of claim 9, wherein the upper and lower bodies are symmetrical to each other.

17. The liquid crystal display of claim 9, wherein the upper and lower bodies are formed in a pixel area and are separated from domain defining members of an adjacent pixel area.

* * * * *